(12) United States Patent
Szarmes et al.

(10) Patent No.: US 8,736,844 B2
(45) Date of Patent: May 27, 2014

(54) SAGNAC FOURIER TRANSFORM SPECTROMETER HAVING IMPROVED RESOLUTION

(75) Inventors: Eric Szarmes, Honolulu, HI (US); Huan Ma, Irvine, CA (US)

(73) Assignee: University of Hawaii, Honolulu, HI (US)

( * ) Notice: Subject to any disclaimer, the term of this patent is extended or adjusted under 35 U.S.C. 154(b) by 178 days.

(21) Appl. No.: 13/154,368

(22) Filed: Jun. 6, 2011

(65) Prior Publication Data

US 2012/0086946 A1    Apr. 12, 2012

Related U.S. Application Data

(60) Provisional application No. 61/352,326, filed on Jun. 7, 2010.

(51) Int. Cl.
*G01J 3/45* (2006.01)

(52) U.S. Cl.
USPC .......................................... 356/451; 356/450

(58) Field of Classification Search
USPC ............................................................ 356/451
See application file for complete search history.

(56) References Cited

U.S. PATENT DOCUMENTS

| | | | |
|---|---|---|---|
| 3,749,498 A * | 7/1973 | Shimomura | 356/333 |
| 3,765,769 A | 10/1973 | Treacy | |
| 5,059,027 A | 10/1991 | Roesler et al. | |
| 5,684,582 A | 11/1997 | Eastman et al. | |
| 5,761,225 A | 6/1998 | Fidric et al. | |
| 5,777,736 A | 7/1998 | Horton | |
| 6,108,082 A | 8/2000 | Pettipiece et al. | |
| 6,687,007 B1 | 2/2004 | Meigs | |
| 7,167,249 B1 | 1/2007 | Otten, III | |
| 7,433,044 B1 * | 10/2008 | Szarmes et al. | 356/451 |
| 7,733,492 B1 | 6/2010 | Szarmes et al. | |
| 2006/0290938 A1 | 12/2006 | Heintzann et al. | |
| 2010/0321688 A1 * | 12/2010 | Bodkin et al. | 356/326 |

OTHER PUBLICATIONS

A.E. Siegman, "Lasers," University Science Books, Mill Valley, CA 1986 (ISBN 0-935702-11-5), Fig. 23.10, p. 905.

Braun et al. "A high precision compact Michelson-Sagnac wavemeter" 1987 J. Phys. E: Sci. Instrum. 20 1247-1249.

Harlander, John M. et al., "Spatial Heterodyne Spectroscopy for High Spectral Resolution Space-Based Remote Sensing," Optics and Photonics News, Jan. 2004, pp. 46-51.

Helg, T.L. et al., "A Novel High-resolution Interference Spectrometer," Optics and Lasers in Engineering 29 (1998), pp. 413-422.

Helg, T.L. et al., Abstract of "A high-resolution spatial heterodyning interference spectrometer," http://cat.inist.fr/?aModele=afficheN&cpsidt=1628248, accessed on Dec. 16, 2008.

(Continued)

*Primary Examiner* — Tarifur Chowdhury
*Assistant Examiner* — Omar Nixon
(74) *Attorney, Agent, or Firm* — Knobbe, Martens, Olson & Bear, LLP

(57) ABSTRACT

A Sagnac interferometer can include a beamsplitter arranged to receive an input beam of light of a design wavelength, to split the input beam of light into first and second beams that counter propagate around an optical path, and to recombine the first and second beams into an output beam of light. The optical path can include at least one diffraction grating that is arranged to satisfy an effective Littrow geometry.

29 Claims, 15 Drawing Sheets

(56) References Cited

OTHER PUBLICATIONS

Helg, T.L., Abstract of "Novel Interferometric Techniques in Profilometry and Spectrometry," http://nzresearch.org.nz/index.php/record/viewSchema/11517/3, accessed on Dec. 16, 2008.
Helg, T.L., "Novel Interferometric Techniques in Profilometry and Spectrometry," University of Auckland, Dec. 1999, Title page and notice in 2 pages, Abstract in 1 page, Acknowledgements in 1 page, Table of contents in 3 pages, pp. 1-144, Appendices in 27 pages.
Office Action (U.S. Appl. No. 11/145,164)—Sep. 13, 2007.
Office Action Response (U.S. Appl. No. 11/145,164)—Dec. 12, 2007.
Notice of Allowance (U.S. Appl. No. 11/145,164)—Apr. 9, 2008.
Office Action (U.S. Appl. No. 11/431,936)—Apr. 28, 2008.
Request for Continued Examination (U.S. Appl. No. 11/145,164)—May 1, 2008.
Notice of Allowance (U.S. Appl. No. 11/145,164)—May 29, 2008.

* cited by examiner

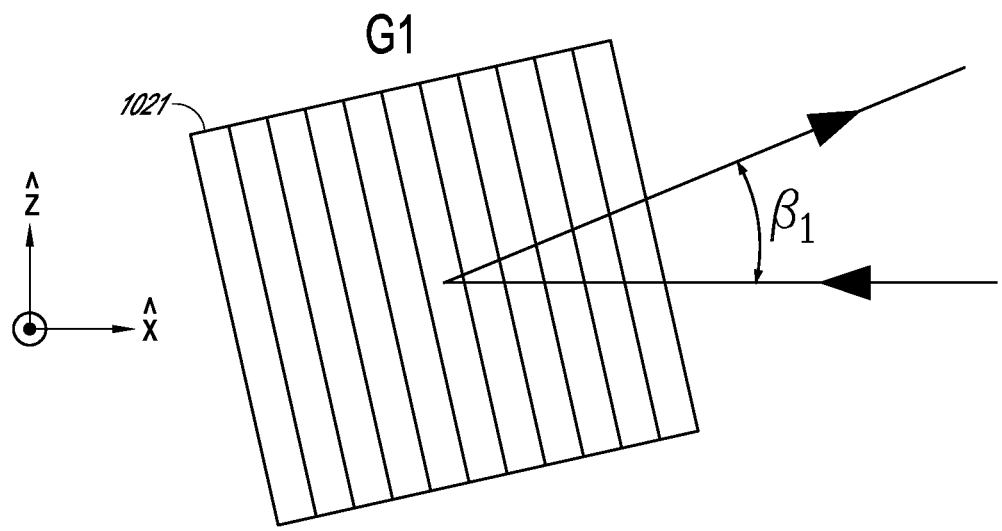
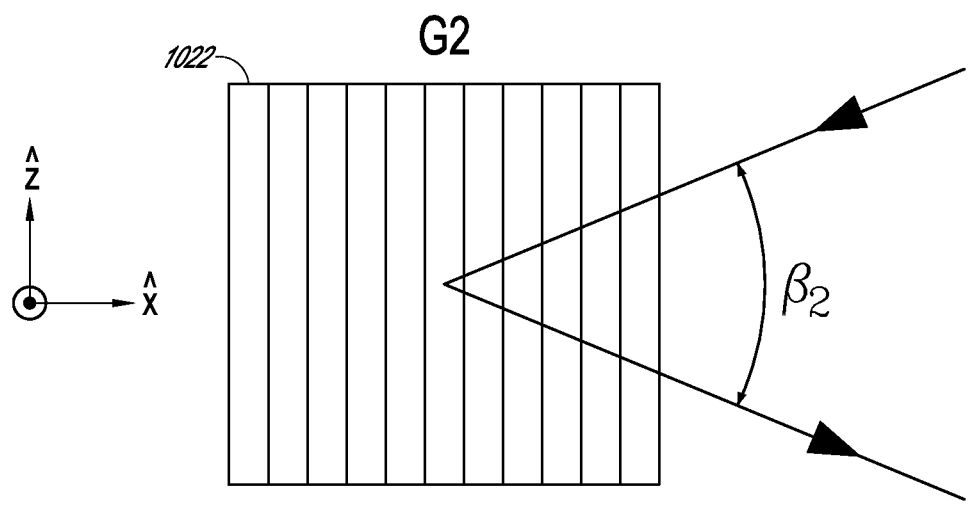
FIG. 10C

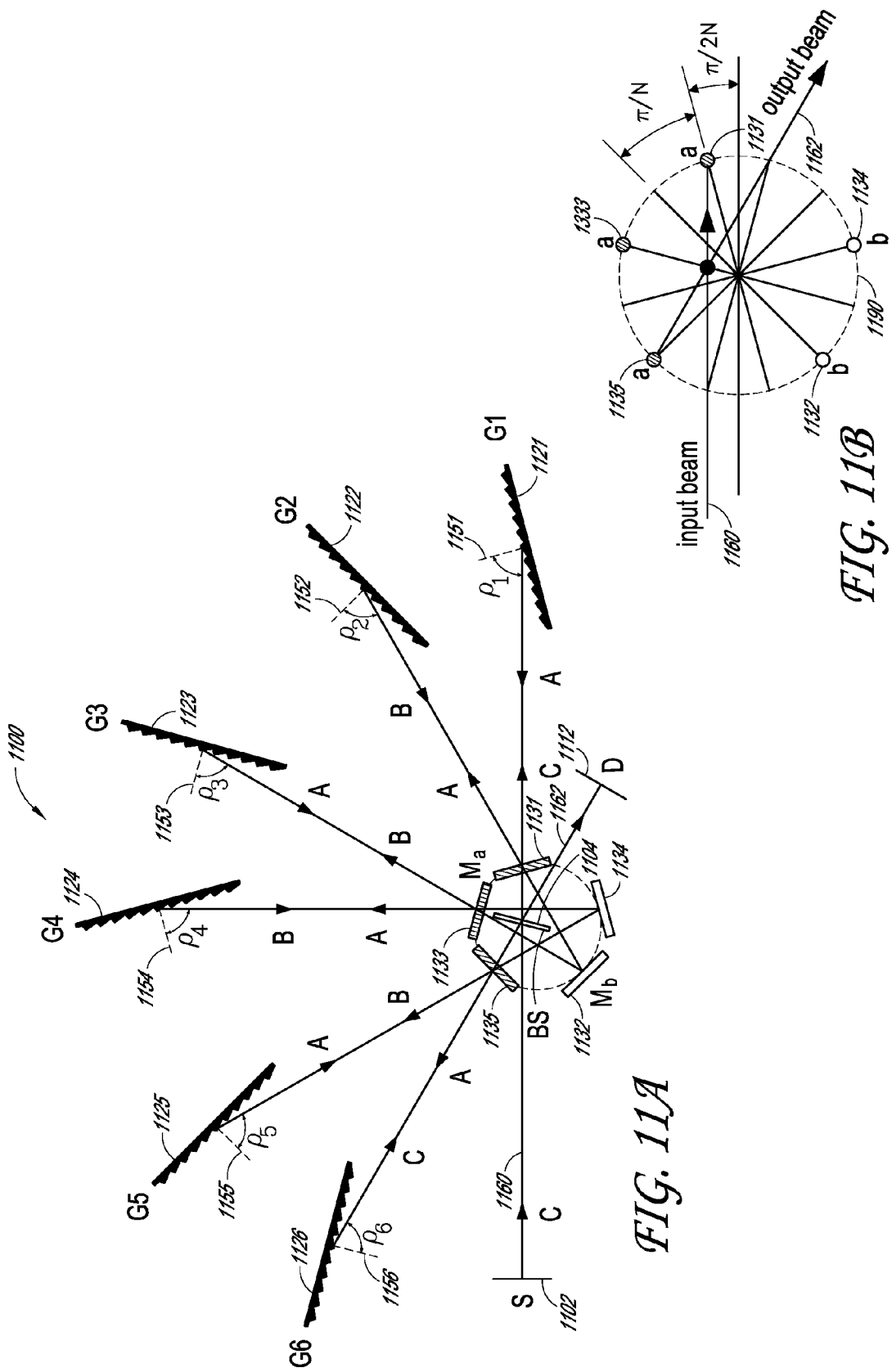

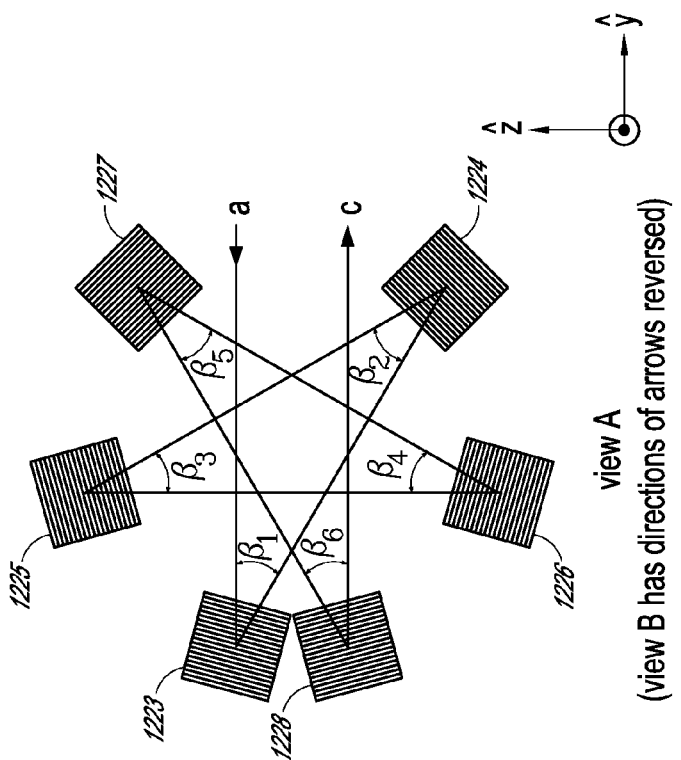
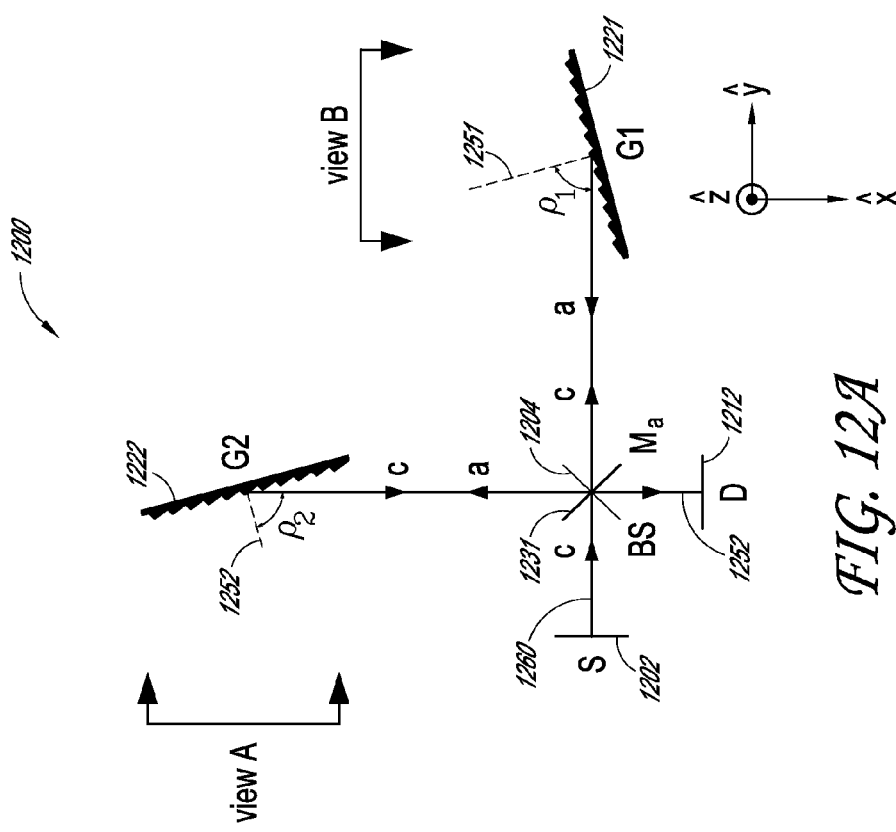
FIG. 12B
FIG. 12A

SAGNAC FOURIER TRANSFORM SPECTROMETER HAVING IMPROVED RESOLUTION

CROSS-REFERENCE TO RELATED APPLICATIONS

This application claims priority to U.S. Provisional Patent Application 61/352,326, filed on Jun. 7, 2010 and entitled "SAGNAC FOURIER TRANSFORM SPECTROMETER HAVING IMPROVED RESOLUTION," which is hereby incorporated herein by reference its entirety to be considered part of this specification.

BACKGROUND OF THE INVENTION

1. Field of the Invention

Embodiments of the invention generally relate to the field of spectrometers, and more specifically to Sagnac interferometer spectrometers.

2. Description of the Related Art

In a Sagnac interferometer, an input light is split into two beams that follow, for example, a ring trajectory in opposite directions. The input light can be split using, for example, a beamsplitter. The two beams, commonly called clockwise and counterclockwise beams or transmitted and reflected beams, can be made to have slight propagation variations. The transmitted and reflected beams can then be recombined by the beamsplitter, at which point such propagation variations can be manifested in effects such as interference patterns. Information about the propagation variations can be measured by, for example, analyzing the interference pattern created by the recombined beams.

In a Sagnac interference spectrometer, one or more diffraction gratings can be included in the optical path of the counter-propagating beams. Dispersion in the grating(s) alters the propagation direction of the two beams, shifting one with respect to the other. The shift in the beams is manifested by a variation in the resultant interference pattern. This interference pattern can be processed to determine the spectral characteristics of the counter-propagating beams. For example, a Fourier transform of the interference pattern yields the wavelength spectra of the beams.

SUMMARY OF THE INVENTION

In some embodiments, a Sagnac interferometer comprises: a beamsplitter arranged to receive an input beam of light of a design wavelength, to split the input beam of light into first and second beams that counter propagate around an optical path, and to recombine the first and second beams into an output beam of light, wherein the optical path comprises at least a first diffraction grating that comprises a plurality of parallel lines, the first diffraction grating being arranged to receive the first beam incident thereon as a first incident beam along a first incident path at a first incident angle and to diffract the first incident beam along a first diffraction path at a first diffraction angle, and wherein the first diffraction grating is oriented such that the first incident path and the first diffraction path are not located in a plane that is normal to the plurality of parallel lines of the first diffraction grating.

In some embodiments, a Sagnac interferometer comprises: a beamsplitter arranged to receive an input beam of light of a design wavelength, to split the input beam of light into first and second beams that counter propagate around an optical path, and to recombine the first and second beams into an output beam of light, wherein the optical path comprises at least a first diffraction grating that comprises a plurality of parallel lines, the first diffraction grating being arranged to receive the first beam incident thereon along a first incident path and to diffract the first beam along a first diffraction path, and wherein the first diffraction path is directed in substantially the same direction as the first incident path when viewed in a plane that is normal to the parallel lines of the first diffraction grating.

In some embodiments, a Sagnac interferometer comprises: a beamsplitter arranged to receive an input beam of light of a design wavelength, to split the input beam of light into first and second beams that counter propagate around an optical path, and to recombine the first and second beams into an output beam of light, wherein the optical path comprises at least a first diffraction grating, the first diffraction grating being arranged to receive the first beam incident thereon along a first incident path and to diffract the first beam along a first diffraction path, and wherein the first incident path and the first diffraction path are angularly separated when projected in a plane that is parallel with the plurality of parallel lines of the first diffraction grating.

In some embodiments, a Sagnac interferometer comprises: a beamsplitter arranged to receive an input beam of light of a design wavelength, to split the input beam of light into first and second beams that counter propagate around an optical path, and to recombine the first and second beams into an output beam of light, wherein the optical path comprises at least a first diffraction grating, the first diffraction grating being oriented in the optical path at an angle to receive the first beam incident thereon along a first incident path and to diffract the first beam along a first diffraction path in a manner that satisfies the effective Littrow geometry.

In some embodiments, a Sagnac interferometer comprises: a beamsplitter arranged to receive an input beam of light of a design wavelength, to split the input beam of light into first and second beams that counter propagate around an optical path, and to recombine the first and second beams into an output beam of light, wherein the optical path comprises at least a first diffraction grating, the first diffraction grating being oriented in the optical path at an angle to receive the first beam incident thereon along a first incident path and to diffract the first beam along a first diffraction path, and wherein both the first incident path and the first diffraction path lie in the Littrow plane of the first diffraction grating.

In some embodiments, a method of designing a Sagnac interferometer comprises: identifying a diffraction grating located in a shared optical path of counter propagating beams of light, the shared optical path comprising an incident beam path and a diffracted beam path for the diffraction grating, and the diffraction grating comprising a plurality of parallel lines; determining a plane of incidence for the selected diffraction grating, the plane of incidence containing the diffraction grating normal and the incident beam path; determining an axis of rotation which lies in the plane of incidence and is perpendicular to the incident beam path; and determining an angular orientation of the selected diffraction grating about the axis of rotation, wherein the angular orientation about the axis of rotation is selected such that the first incident path and the first diffraction path are not located in a plane that is normal to the plurality of parallel lines of the first diffraction grating, and wherein the method is at least partially performed using a processor.

In some embodiments, a Sagnac interferometer comprises: a beamsplitter arranged to receive an input beam of light of a design wavelength, to split the input beam of light into first and second beams that counter propagate around an optical path, and to recombine the first and second beams into an output beam of light, the path of the input beam of light and the beamsplitter normal jointly defining a reference plane; wherein the optical path comprises at least one mirror or grating that is out of the reference plane.

BRIEF DESCRIPTION OF THE DRAWINGS

Example embodiments are illustrated in the accompanying drawings, which are for illustrative purposes only.

FIGS. 10A-10C are schematic diagrams of a first Sagnac interferometer formed using a beamsplitter, mirrors, and diffraction gratings arranged such that the incident and diffracted beams at each diffraction grating effectively achieve the Littrow geometry;

FIGS. 11A and 11B are schematic diagrams of a second Sagnac interferometer formed using a beamsplitter, mirrors, and diffraction gratings arranged such that the incident and diffracted beams at each diffraction grating effectively achieve the Littrow geometry;

FIGS. 12A and 12B are schematic diagrams of a third Sagnac interferometer formed using a beamsplitter, a mirror, and diffraction gratings arranged such that the incident and diffracted beams at each diffraction grating effectively achieve the Littrow geometry;

DETAILED DESCRIPTION OF THE PREFERRED EMBODIMENT

This specification describes embodiments of the design and operation of various compact, spatial heterodyne Fourier transform spectrometers (FTS) based on various embodiments of dispersive Sagnac interferometers. The spectral resolution is significantly improved by the use of, for example, a plurality of diffraction gratings whose dispersions are added in series for each of the counterpropagating beams in the common beam path. For some interferometer embodiments, the resolving power is directly proportional to the number of gratings, with theoretical resolving powers exceeding, for example, $\lambda/\delta\lambda=2,800,000$ in the visible for a four-grating FTS. The following discussion describes the basic analytic theory of the Sagnac FTS for systems incorporating an arbitrary number of gratings.

In some embodiments of a stationary Fourier transform spectrometer, a collimated input beam from a light source is directed into an interferometer and divided into two phase-coherent beams by a beam splitter. These beams travel through the interferometer and are made to form a small crossing angle at the output port, thus forming a spatial intensity pattern (interferogram) in the overlap region of the two beams. The interferogram encodes the spectral content of the light source, which can be extracted, for example, by recording the interferogram with a detector array and computing the Fourier transform.

For a monochromatic plane wave of wavelength $\lambda$ and frequency $v=c/\lambda$ crossing at a small angle $\alpha$, the interferogram intensity is sinusoidal with a spatial frequency $\sigma$ given by $$\sigma=\alpha/\lambda=(\alpha/c)v, \quad (1)$$

where c is the speed of light. Since the interferogram is sampled by a detector array, the detected interferogram is a discrete series. According to the sampling theorem, the highest spatial frequency that can be recorded without aliasing is the Nyquist frequency $\sigma_N$ equal to one half of the sampling frequency. If there are N sampling points in the interferogram, the discrete Fourier transform will generate N/2 independent complex data points in the frequency domain. Therefore, the interval of the discrete spatial frequency is $$\delta\sigma=\sigma_N/(N/2)=2\sigma_N/N. \quad (2)$$

For an N-element detector array of length L, the Nyquist frequency is $\sigma_N=N/2L$, and Eq. (2) reduces to $$\delta\sigma=1/L. \quad (3)$$

The spatial frequency resolution cannot be smaller than this discrete interval, which determines the optical spectral resolution $\delta v$ calculated from Eq. (1). The optical free spectral range corresponding to the Nyquist frequency $\sigma_N=(N/2)\delta\sigma$ is then $V_{FSR}=(n/2)\delta v$.

Figure 1:
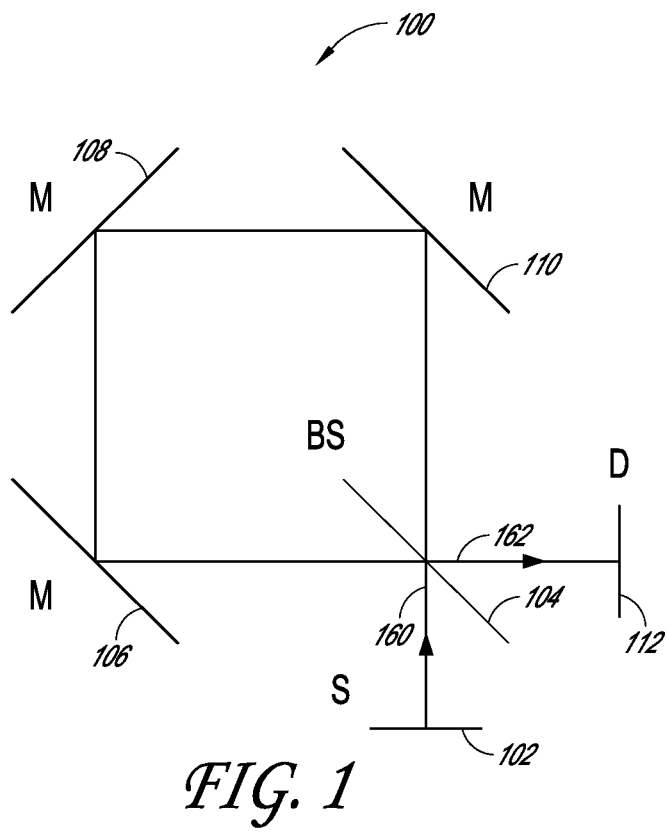
FIG. 1 is a schematic diagram of a Sagnac interferometer formed using a beamsplitter and three mirrors.

FIG. 1 is a schematic diagram of a Sagnac interferometer 100 formed using a beamsplitter 104 and three mirrors 106, 108, 110. A light source 102 directs an input light beam 160 toward the beamsplitter 104. The beamsplitter 104 separates the input beam 160 into transmitted and reflected beams that counter propagate around an optical path loop formed by the mirrors 106, 108, 110. After propagating around the loop, the transmitted and reflected beams are recombined by the beamsplitter 104 into an output beam 162. The transmitted and reflected beams interfere in the output beam to create an interference pattern that is sensed by the detector 112.

For the Sagnac interferometer 100 illustrated in FIG. 1, the crossing angle $\alpha$ is generated by tilting one of the mirrors 106, 108, 110. In this case $\alpha$ is independent of optical frequency, and the spatial frequency $\sigma$ varies linearly with $v$. As a result, the optical free spectral range $v_{FSR}$ is measured from zero frequency, and the resolving power $R=v/\delta\sigma$ cannot exceed the relatively small value of R=N/2.

Substantial improvement is realized when dispersion is included within the interferometer. In this case α varies approximately linearly with frequency over a narrow bandwidth, and can be chosen by design to equal zero at an arbitrary, non-zero value of the optical frequency (the heterodyne frequency $\nu_0$). If the design wavelength $\lambda_0$ of the interferometer is designed to correspond to the heterodyne frequency, then differentiation of Eq. (1) with respect to a variation $\Delta\lambda$ about the design wavelength yields $$\Delta\sigma = \frac{\Delta\alpha}{\lambda}\bigg|_{\lambda_0} - \frac{\alpha\Delta\lambda}{\lambda^2}\bigg|_{\lambda_0} \quad (4)$$
$$= \frac{\Delta\alpha}{\lambda_0}.$$

If A equals the minimum resolution $\delta\sigma=1/L$ for a detector of length L, then the corresponding variation $\delta\lambda$ yields a maximum resolving power of $$R = \frac{\lambda_0}{\delta\lambda} = L\left|\frac{\Delta\alpha}{\Delta\lambda}\right|. \quad (5)$$

where $|\Delta\alpha/\Delta\lambda|$ is the dispersion relation for the system. Designs that increase the dispersion of the system can therefore yield increased resolving powers. An example of such a dispersive interferometer is the two-grating Sagnac interferometer illustrated schematically in FIG. 2.

Figure 2:
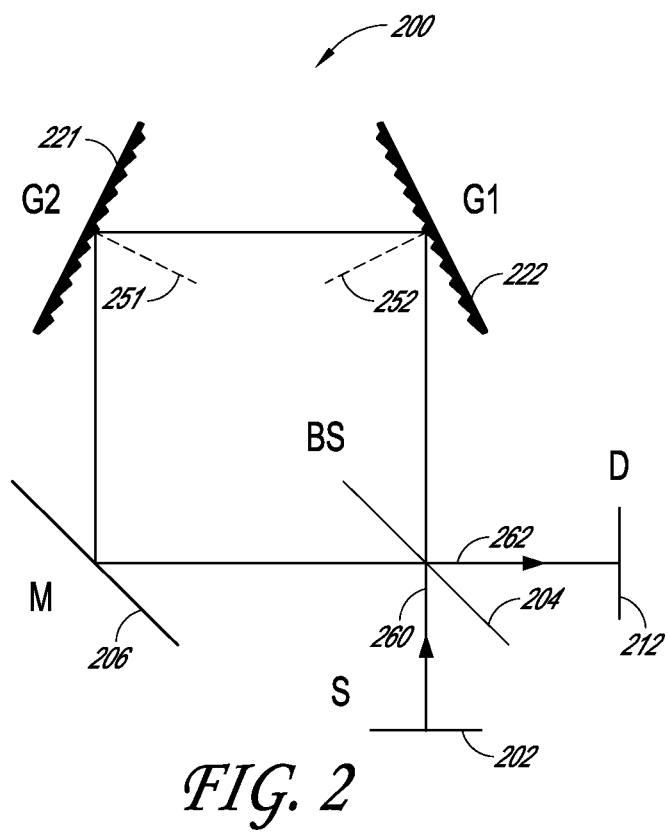
FIG. 2 is a schematic diagram of a Sagnac interferometer formed using a beamsplitter, a mirror, and two diffraction gratings.

FIG. 2 is a schematic diagram of a Sagnac interferometer 200 formed using a beamsplitter 204, a mirror 206, and two diffraction gratings 221, 222. A light source 202 directs an input light beam 260 toward the beamsplitter 204. The beamsplitter 204 separates the input beam 260 into transmitted and reflected beams that counter propagate around an optical path loop formed by the mirror 206 and the diffraction gratings 221, 222. After propagating around the loop, the transmitted and reflected beams are recombined by the beamsplitter 204 into an output beam 262. The transmitted and reflected beams interfere in the output beam to create an interference pattern that is sensed by the detector 212. The Sagnac interferometer 200 is obtained by replacing two of the mirrors 106, 108, 110 from the design illustrated in FIG. 1 by reflective gratings. As discussed above, introduction of the gratings 221, 222 adds dispersion to the system, which can increase the resolving power of the interferometer 200.

The crossing angle α for a grating-based Sagnac interferometer incorporating an arbitrary number of gratings in series can be derived from the grating equation $$\sin\varphi_i = \sin\theta_i + m_i\frac{\lambda}{d_i}, \quad (6)$$

where $\theta_i$ is the angle of incidence, $\varphi_i$ is the angle of diffraction, $m_i$ is the diffraction order, and $d_i$ is the line period of the $i^{th}$ grating. In addition to the explicit dependence of p on resulting from diffraction, there is also an implicit dependence on $\lambda$ through the angle $\theta_i$ resulting from angular dispersion in the preceding gratings. Differentiation of Eq. (6) thus yields the variation $\Delta_{\varphi i}$ in the angle of diffraction, $$\cos\varphi_i \cdot \Delta\varphi_i = \cos\theta_i \cdot \Delta\theta_i + m_i\frac{\Delta\lambda}{d_i}, \quad (7)$$

where $\Delta\lambda=\lambda-\lambda_0$. The resulting crossing angle $\alpha=\Delta\alpha$ at the output of the interferometer due to a deviation of $\Delta\lambda$ from the design wavelength is then $$\Delta\alpha=|\Delta\phi_{trans}-\Delta\phi_{refl}|, \quad (8)$$

where the net diffraction angles $\Delta\phi_{trans}$ and $\Delta\phi_{refl}$ represent the accumulated angular deviations for the two counterpropagating beams (transmitted twice and reflected twice at the beam splitter, respectively.) These deviations may be taken to be positive if they are counter-clockwise with respect to the output optical axis, and negative if clockwise.

Two design principles may help to increase or maximize the crossing angle that is achieved for a given configuration of gratings in a Sagnac interferometer. First, the absolute angular deviation $\Delta\phi_i$ is increased or maximized for a given pair of gratings when the two terms on the right hand side of Eq. (7) have the same sign. This can be referred to as the reinforcement principle. If two adjacent gratings reinforce each other in one direction around the common path, they will do so for the counterpropagating beam as well. Furthermore, for two adjacent gratings for which the terms partially cancel, reinforcement can always be recovered in both directions by, for example, inserting an odd number of mirrors between the gratings (with a corresponding reorientation of the gratings to preserve the angles of incidence and diffraction). The principle of reinforcement is described in further detail in U.S. Pat. Nos. 7,433,044 and 7,733,492, the entire contents of both of which are incorporated by reference herein to be considered a part of this specification. All aspects of establishing and using the principle of reinforcement in a Sagnac interferometer that are described in the '044 and '492 patents are also applicable to the Sagnac interferometers described herein. Thus, in some embodiments, the Sagnac interferometers described herein include any or all of the features described in the '044 and '492 patents.

Second, for given magnitudes of $\Delta\phi_{trans}$ and $\Delta\phi_{refl}$, the crossing angle is increased or maximized if the two output beams lie on opposite sides of the output optical axis. This can be referred to as the crossing principle. For designs in which the beams lie on the same side of the output axis, the maximum crossing angle can always be recovered by, for example, inserting an odd number of mirrors adjacent to the beam splitter in the common path. The principle of crossing is described in further detail in the '044 and '492 patents. All aspects of establishing and using the principle of crossing in a Sagnac interferometer that are described in the '044 and '492 patents are also applicable to the Sagnac interferometers described herein. Thus, in some embodiments, the Sagnac interferometers described herein include any or all of the features described in the '044 and '492 patents.

Figure 3:
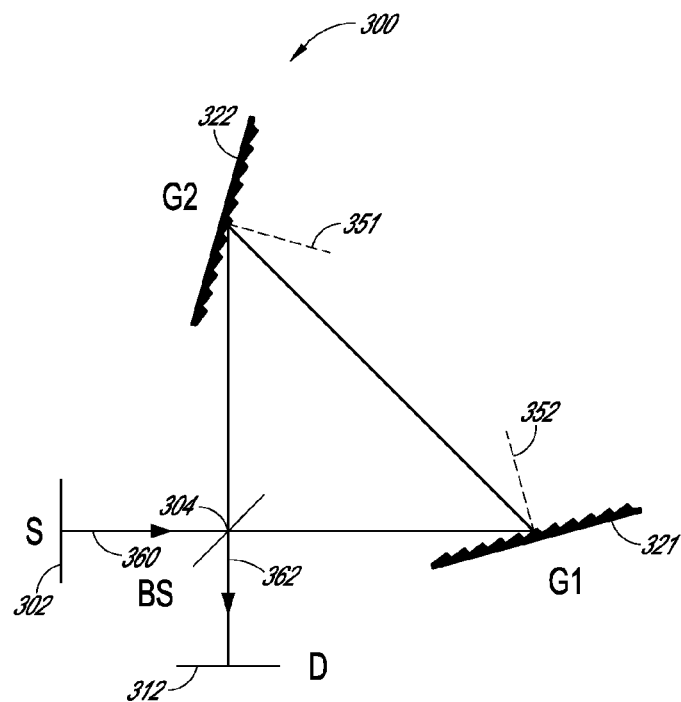
FIG. 3 is a schematic diagram of a Sagnac interferometer formed using a beamsplitter and two diffraction gratings that are arranged such that the reinforcement principle is satisfied.
Figure 4:
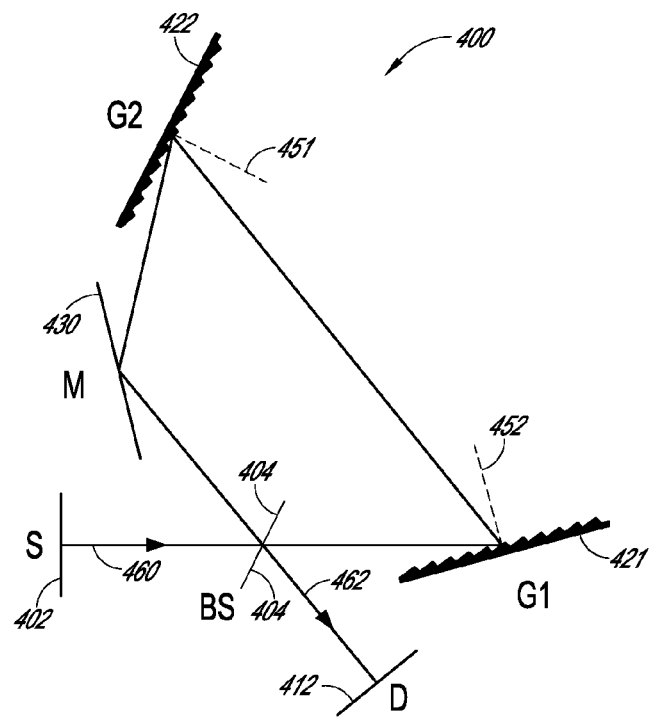
FIG. 4 is a schematic diagram of a Sagnac interferometer formed using a beamsplitter and two diffraction gratings that are arranged such that the reinforcement principle is satisfied, and a mirror arranged such that the crossing principle is satisfied.
Figure 5:
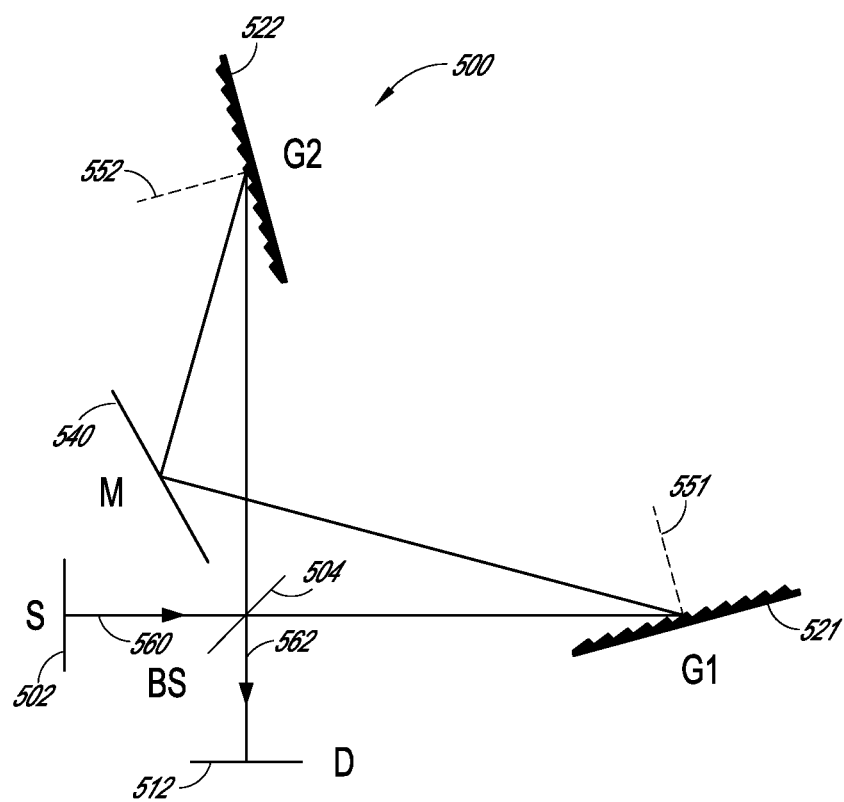
FIG. 5 is a schematic diagram of a Sagnac interferometer formed using a beamsplitter, two diffraction gratings, and a mirror that are arranged such that the reinforcement and crossing principles are satisfied.

The reinforcement principle and the crossing principle are both satisfied by the two-grating Sagnac interferometer of FIG. 2. Relatively more sharp-angled variants of the two-grating system shown in FIG. 2 are illustrated in FIGS. 3, 4, and 5. FIGS. 4 and 5 illustrate how a mirror can be employed to satisfy the reinforcement and crossing principles.

FIG. 3 is a schematic diagram of a Sagnac interferometer 300 formed using a beamsplitter 304 and two diffraction gratings 351, 352 that are arranged such that the reinforcement principle is satisfied. A light source 302 directs an input beam of light 360 at the beamsplitter 304, which separates the input beam 360 into a transmitted beam and a reflected beam.

The transmitted beam passes from the beamsplitter 304 to the first grating 321. The transmitted beam of light is diffracted from the first grating 321 at an angle that lies on the same side of the grating normal 352 as the incident angle. The transmitted beam then proceeds to the second grating 322 where it is once again diffracted at an angle that lies on the same side of the grating normal 351 as the incident angle. After diffracting from the second grating 322, the transmitted beam proceeds back to the beamsplitter 304 where it is recombined with the reflected beam (which traverses the interferometer in the opposite direction) into an output beam 362. The recombination of the transmitted beam and the reflected beam in the output beam 362 forms an interference pattern which is imaged on the detector 312. The Sagnac interferometer 300 satisfies the reinforcement principle, but not the crossing principle, for reasons that are described in, for example, the '492 patent.

FIG. 4 is a schematic diagram of a Sagnac interferometer 400 formed using a beamsplitter 404 and two diffraction gratings 421, 422 that are arranged such that the reinforcement principle is satisfied, and a mirror 430 arranged such that the crossing principle is satisfied. The Sagnac interferometer 400 in FIG. 4 operates similarly to the Sagnac interferometer 300 illustrated in FIG. 3. However, the Sagnac interferometer 400 in FIG. 4 includes a mirror 430 between the beamsplitter 404 and the second grating 422. As discussed in the '492 patent, this mirror 430 is used to cause the Sagnac interferometer 400 to satisfy the crossing principle.

FIG. 5 is a schematic diagram of a Sagnac interferometer 500 formed using a beamsplitter 504, two diffraction gratings 521, 522, and a mirror 540 that are arranged such that the reinforcement principle is satisfied, as discussed in the '492 patent. The Sagnac interferometer 500 in FIG. 5 operates similarly to the Sagnac interferometer 300 illustrated in FIG. 3. However, in the Sagnac interferometer 500, the crossing principle is satisfied without the further insertion of any mirrors between the beamsplitter and either grating.

An arbitrary number of gratings (even or odd) can be used in a Sagnac FTS according to various embodiments. In order to derive the general expression for the resolving power, it is sufficient to analyze the four-grating Sagnac interferometer shown in FIG. 6.

Figure 6:
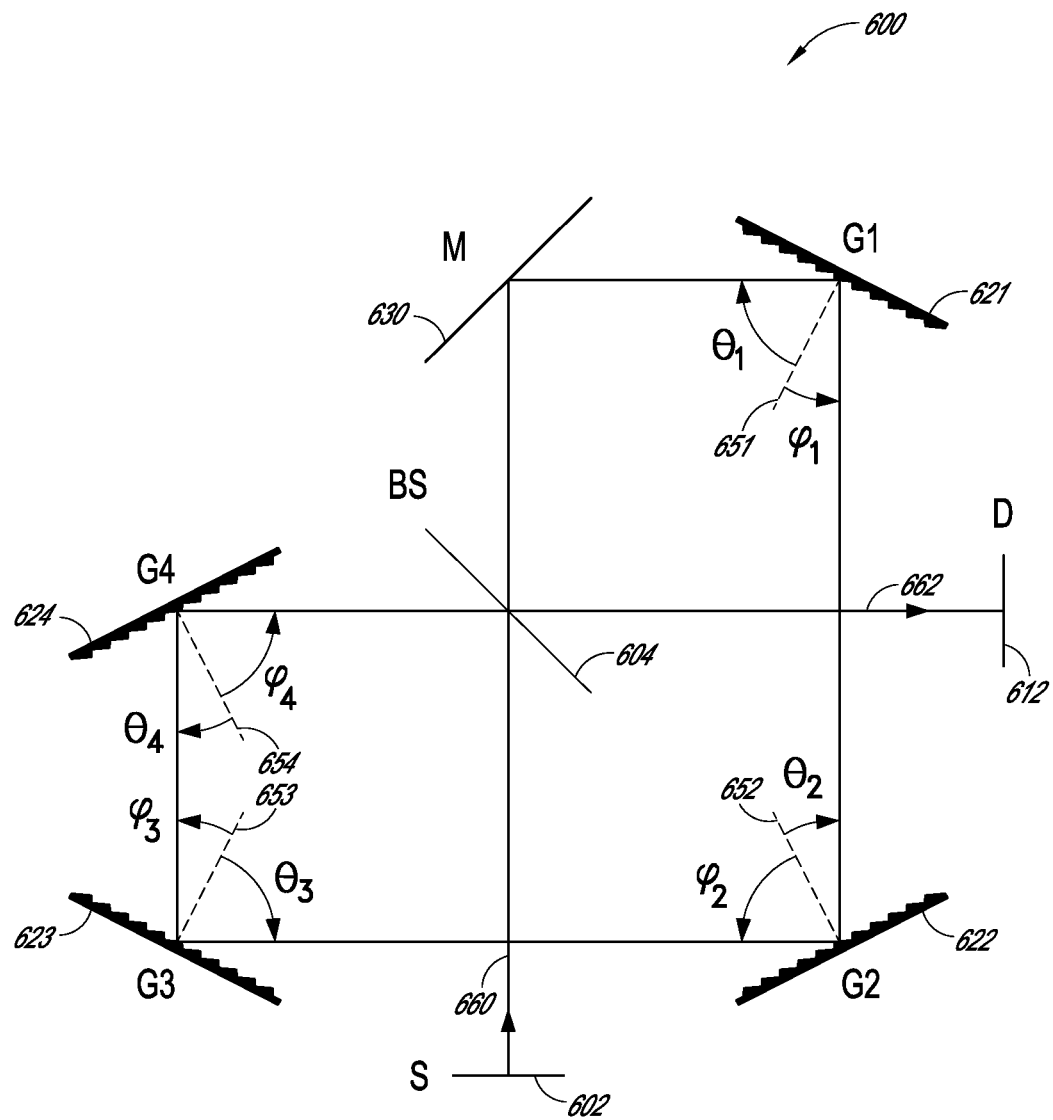
FIG. 6 is a schematic diagram of a four-grating Sagnac interferometer.

FIG. 6 is a schematic diagram of a four-grating Sagnac interferometer 600. Although FIG. 6 is drawn with approximately right angles between the incident and diffracted beams at the gratings 621-624, the following derivation does not depend on this condition, and the general result can be applied to any geometry including the sharper-angled configuration shown in FIG. 7. With respect to FIG. 6 and the following derivation, the following conventions are used: $\{\theta_i, \phi_i\}$ respectively designate the angles of {incidence, diffraction} for the transmitted beam and {diffraction, incidence} for the reflected beam; all $\theta_i$ are positive; the signs of $\phi_i$ and $m_i$ are determined by Eq. (6); and the gratings 621-624 are numbered sequentially around the transmitted beam path starting with grating 1 (621) following the beam splitter.

Let us first consider the transmitted beam at wavelength $\lambda = \lambda_0 + \Delta\lambda$. The deflection angle of the diffracted beam at grating 1 (621) is calculated from Eq. (7) to be $$\Delta\varphi_i = \frac{m_i \Delta\lambda}{d_1 \cos\varphi_1}, \quad (9)$$

where $\Delta\theta_1$ equals zero for this grating. At grating 2 (622), the deflection of the incident beam $\Delta\theta_2$ is equal to $\Delta\phi_1$ in absolute value, but its sign depends on the geometry of the two gratings (621, 622). Therefore, the deflection $\Delta\theta_2$ can be expressed as $$\Delta\theta_2 = \eta_{12}\Delta\phi_1, \quad (10)$$

where $\eta_{12} = \eta_{12} = \pm 1$ is the "geometry factor" for gratings 1 (621) and 2 (622), which can be changed by inserting an odd number of mirrors between the two gratings. Substitution of $\Delta\theta_2$ from Eqs. (10) and (9) into Eq. (7) yields the net deflection of the diffracted beam at grating 2 (622), $$\Delta\varphi_2 = \frac{\cos\theta_2}{\cos\varphi_2}\eta_{12}\Delta\varphi_1 + \frac{m_2 \Delta\lambda}{d_2 \cos\varphi_2} \quad (11)$$

$$= \frac{\Delta\lambda}{\cos\varphi_1 \cos\varphi_2}\left(\frac{m_1 \eta_{12}}{d_1}\cos\theta_2 + \frac{m_2}{d_2}\cos\varphi_1\right)$$

The above calculation can be continued for the remaining gratings (623, 624) in the system. The resulting net deflection of the transmitted output beam at grating 4 (624), $\Delta\phi_{trans} = \Delta\phi_4$, is found to be $$\Delta\varphi_4 = \frac{\Delta\lambda}{\cos\varphi_1 \cos\varphi_2 \cos\varphi_3 \cos\varphi_4} \quad (12)$$

$$\begin{pmatrix} \frac{m_1 \eta_{12} \eta_{23} \eta_{34}}{d_1}\cos\theta_2 \cos\theta_3 \cos\theta_4 + \\ \frac{m_2 \eta_{23} \eta_{34}}{d_2}\cos\theta_3 \cos\theta_4 \cos\varphi_1 + \\ \frac{m_3 \eta_{34}}{d_3}\cos\theta_4 \cos\varphi_1 \cos\varphi_2 + \\ \frac{m_4}{d_4}\cos\varphi_1 \cos\varphi_2 \cos\varphi_3 \end{pmatrix}$$

$$= \left(\frac{\Delta\lambda}{\prod_{i=1}^{4}\cos\varphi_i}\right) \sum_{i=1}^{4} \left[\frac{\frac{m_i}{d_i}\left(\prod_{j=i}^{3}\eta_{j,j+1}\right)}{\left(\prod_{k=i+1}^{4}\cos\theta_k\right)\left(\prod_{l=1}^{i-1}\cos\varphi_l\right)}\right]$$

A similar calculation can be performed for the counter-propagating (reflected) beam in FIG. 6. The result can also be obtained directly from Eq. (12) by formally exchanging $\theta \leftrightarrow \phi$, replacing ascending indices $\{1, \ldots, 4\}$ with descending indices $\{4, \ldots, 1\}$ and substituting $m \to -m$. The deflection of the reflected output beam at grating 1 (621), $\Delta\phi_{refl} = -\Delta\theta_1$, is then $$\Delta\theta_1 = \quad (13)$$

$$\left(\frac{-\Delta\lambda(\eta_{12}\eta_{23}\eta_{34})}{\prod_{i=1}^{4}\cos\theta_i}\right) \sum_{i=1}^{4}\left[\frac{m_i}{d_i}\left(\prod_{j=i}^{3}\eta_{j,j+1}\right)\left(\prod_{k=i+1}^{4}\cos\theta_k\right)\left(\prod_{l=1}^{i-1}\cos\varphi_l\right)\right]$$

Note that the summations in Eqs. (12) and (13) are identical. Each of the four terms in this summation can be respectively designed to have the same sign by appropriate choice of the geometry factors for the gratings. In this manner, the reinforcement principle can be satisfied for each pair of adjacent gratings. In this way, an increased or maximum absolute value for the summation can be obtained. The overall deflections $\Delta\phi_4$ and $\Delta\theta_1$ can also be chosen independently to have the same sign by enforcing the crossing principle, in which case the crossing angle of the two output beams is simply the sum of the absolute values of $\Delta\phi_4$ and $\Delta\theta_1$.

The dispersion relation for Sagnac interferometers employing an arbitrary number of gratings can be obtained from the preceding results by induction. If the reinforcement principle and the crossing principle are both satisfied, then $m_i \to |m_i|$ in Eqs. (12) and (13), $|\alpha|=|\Delta\phi_{trans}|+|\Delta\phi_{refl}|$ in Eq. 8, and the dispersion relation for the crossing angle is $$\left|\frac{\Delta\alpha}{\Delta\lambda}\right| = \left(\frac{1}{\prod_{i=1}^{N}\cos\theta_i} + \frac{1}{\prod_{i=1}^{N}\cos\varphi_i}\right)\sum_{i=1}^{N}\left[\frac{|m_i|}{d_i}\left(\prod_{k=i+1}^{N}\cos\theta_k\right)\left(\prod_{l=1}^{i-1}\cos\varphi_l\right)\right], \quad (14)$$

where N is the number of gratings, $\theta_i$ and $\phi_i$ are the angles of incidence and diffraction, and $m_i$ and $d_i$ are the diffraction order and line period for the $i^{th}$ grating along the transmitted beam path. If the Sagnac FTS employs a detector array of length L, then the maximum resolving power is given by Eqs. (14) and (5).

The increase in resolving power in systems employing relatively sharper angles of diffraction, as illustrated in, for example, FIGS. 3-5 and 7, can be understood from Eq. (14). By the sign convention in Eq. (6), the angles $\theta_i$ and $\phi_i$ have the same sign if they lie on opposite sides of the grating normal, or opposite signs if they lie on the same side. Since these angles only appear as the arguments of cosine functions in Eq. (14), their signs do not explicitly affect the dispersion. However, angles that lie on the same side of the grating normal use a higher line density $1/d_i$, and this factor increases the dispersion and resolving power in the corresponding terms in Eq. (14).

A fully symmetric N-grating Sagnac interferometer may have an even number of substantially identical gratings of order $m_i=m$ and line period $d_i=d$ whose geometry is arranged to satisfy $$\theta=\theta_1=\theta_3=\ldots=\theta_{N-1}=(\pm)\phi_2=(\pm)\phi_4=\ldots=(\pm)\phi_N,$$
$$\phi=\phi_1=\phi_3=\ldots=\phi_{N-1}=(\pm)\theta_2=(\pm)\theta_4=\ldots=(\pm)\theta_N, \quad (15)$$

where the +(−) signs are formally applied if the $\phi_i$ are positive (negative).

Figure 7:
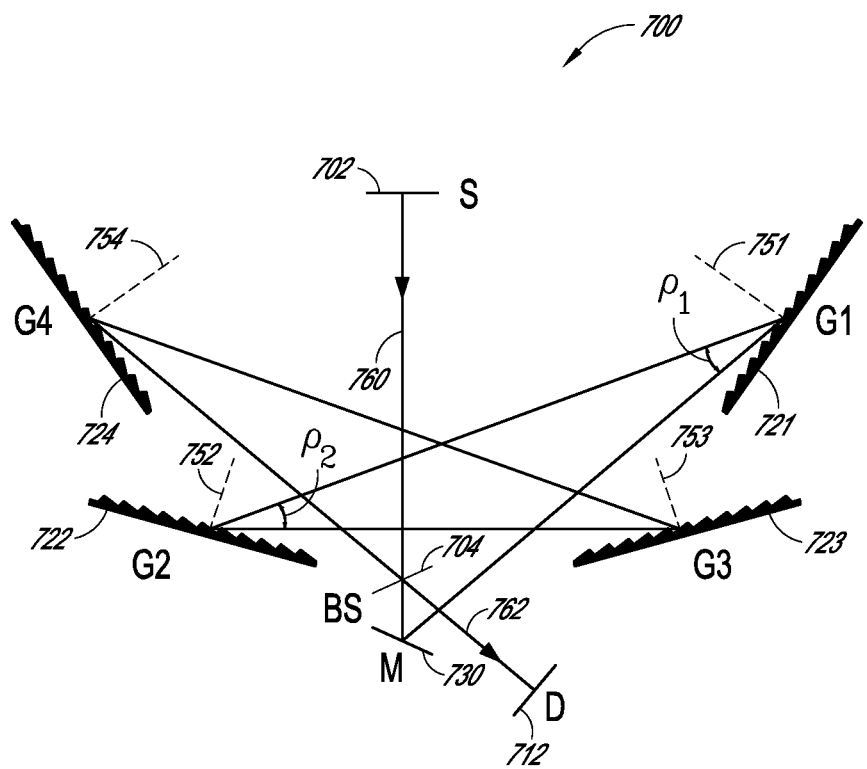
FIG. 7 is a schematic diagram of a symmetric four-grating Sagnac interferometer with greater resolving power than that of FIG. 6.

FIG. 7 is a schematic diagram of a symmetric four-grating Sagnac interferometer 700 with greater resolving power than that of FIG. 6. The Sagnac interferometer 700 includes a light source 702 that creates an input beam 760 which is incident upon a beam splitter 704. The beam splitter 704 separates the input beam 760 into a transmitted beam and a reflected beam. The transmitted beam passes from the beamsplitter 704 to a mirror 730, which reflects the transmitted beam toward the first grating 721. The transmitted beam is then diffracted by the first grating 721 toward the second grating 722, which diffracts the transmitted beam toward the third grating 723, which diffracts the transmitted beam toward the fourth grating 754. The four gratings 721-724 of the Sagnac interferometer 700 are arranged to satisfy Eq. (15). For example, the angle of incidence of the transmitted beam at the first grating 721 is equal to its angle of incidence at the third grating 723. Moreover, the angle of incidence of the transmitted beam at the first grating 721 is equal to its angle of diffraction at the second grating 722 and the fourth grating 754.

An advantage of the symmetric configuration is that the transmitted and reflected output beams have the same beam size and thus improve or optimize the beam overlap area at the detector. If this condition is not satisfied, optical energy may be lost in the formation of the interferogram unless appropriate beam size matching optics are included within the common path of the interferometer. Under symmetric conditions, the resolving power obtained from Eqs. (14) and (5) reduces to $$R = \frac{2N\ mL}{d\cos\theta}. \quad (16)$$

The resolving power is directly proportional to the number of gratings, and is increased or maximized for geometries employing a relatively larger angle of incidence θ and a relatively larger angle of diffraction (via the ratio of m/d).

Although a Sagnac FTS can operate as a stationary spectrometer for measuring spectra within the free spectral range at a given design wavelength, it is possible to configure the system to operate at different design wavelengths and thus obtain a tunable spectrometer. For example, the fixed geometry of the common beam path in a given Sagnac interferometer could be preserved at different design wavelengths by rotating the gratings to maintain the same angle between the incident and diffracted beams, with only a modest reduction in the blaze efficiency. Thus, in some embodiments, one or more gratings, mirrors, or other optical elements in a Sagnac FTS described herein can be rotatable about an axis, or about two or three orthogonal axes. In such embodiments, actuators may be provided to rotate the optical elements by a desired amount in a desired direction, as controlled by a control system that is communicatively coupled to the actuators.

Figure 8:
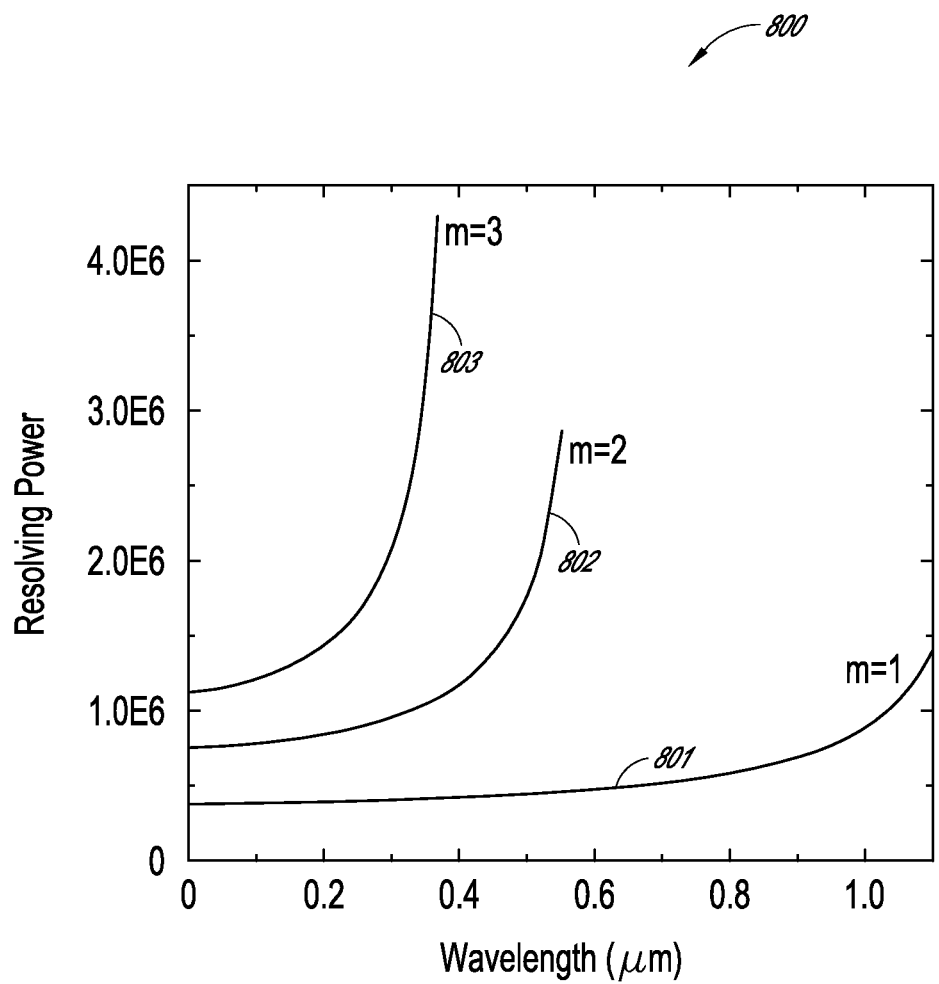
FIG. 8 is a plot of theoretical resolving power as a function of design wavelength and diffraction order for a tunable, symmetric four-grating Sagnac Fourier transform spectrometer.

As an example, FIG. 8 is a plot 800 of theoretical resolving power as a function of design wavelength and diffraction order for a tunable, symmetric four-grating Sagnac Fourier transform spectrometer. In particular, FIG. 8 illustrates the maximum resolving power from Eq. (16) at design wavelengths below 1.1 μm for the 4-grating Sagnac FTS 700 illustrated in FIG. 7, assuming a silicon detector array of length L=28.7 mm (2048 pixels with 14 μm spacing), a line density of 1/d=1622 lines/mm, and 20° between the incident and diffracted beams. The plot 800 illustrates the theoretical maximum resolving power for the first, second, and third diffractive orders (curves 801, 802, 803, respectively). For operation on a given order, the resolving power decreases with wavelength due to the decrease in the angle of incidence required to preserve the beam geometry. However, at wavelengths shorter than the successive inverse-harmonics, operation on successively increasing orders m restores the original angles of incidence θ, and the resolving power then increases in direct proportion to m. As illustrated by curve 802, the resolving power is $2.87(10)^6$ at 550 nm for m=2. Tunability can be achieved by rotating the gratings to maintain, for example, 20° between the incident and diffracted beams at all wavelengths. In some embodiments, the maximum angle of incidence is θ=75° at 1.1 μm and its inverse-harmonics, and the rotation angles that yield the greatest resolving power are Δθ=38° (m=1), 28° (m=2), and 22° (m=3).

Figure 9:
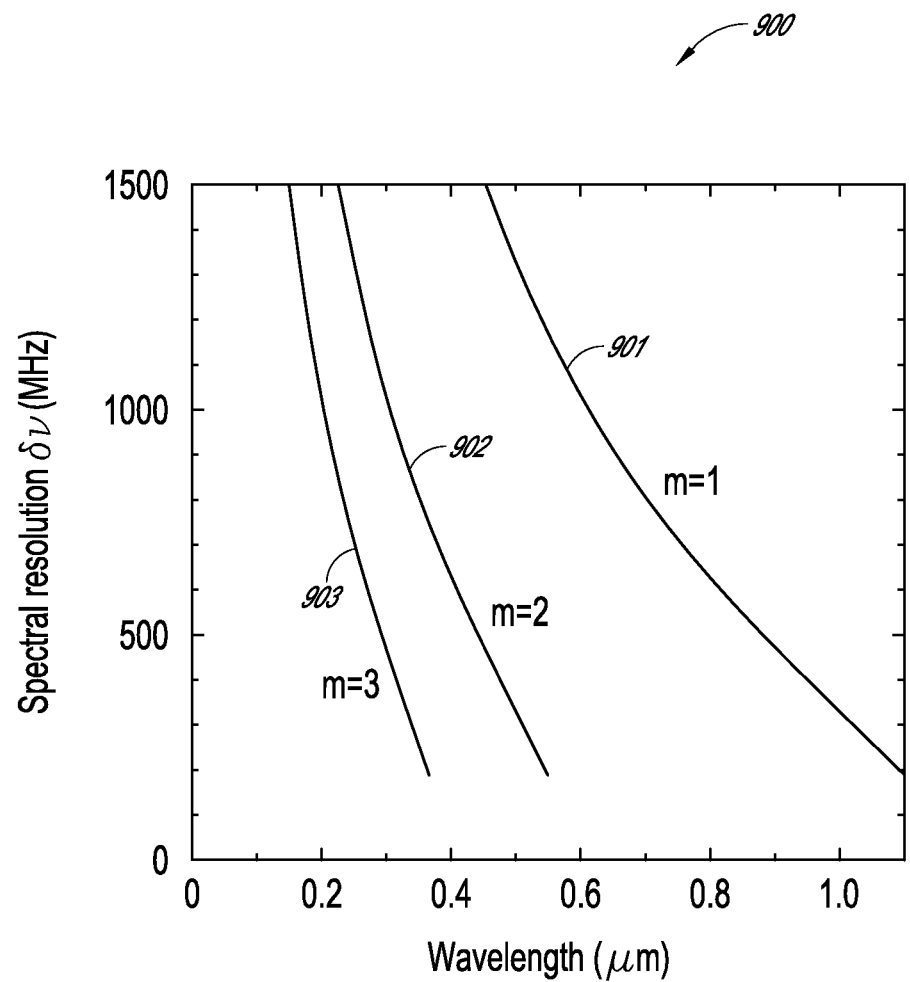
FIG. 9 is a plot of theoretical spectral resolution as a function of design wavelength and diffraction order for a tunable, symmetric four-grating Sagnac Fourier transform spectrometer.

FIG. 9 is a plot 900 of theoretical spectral resolution as a function of design wavelength and diffraction order for a tunable, symmetric four-grating Sagnac FTS. In particular, FIG. 9 illustrates the spectral resolution δν for the 4-grating Sagnac FTS 700 illustrated in FIG. 7 and discussed with respect to FIG. 8. The plot 900 includes curves 901, 902, 903 for the first, second, and third diffractive orders, respectively. The free spectral range is N/2=1024 times greater than the spectral resolution at all wavelengths. In some embodiments, the minimum spectral resolution is 190 MHz at 1.1 μm and its inverse-harmonics As given above in Eq. 16, the resolving power of the symmetric, N-grating Sagnac Fourier transform spectrometer is given by R=2NmL/d cos θ, where N is the number of gratings, m is the diffraction order, L is the length of the detector array, d is the grating period, and θ is the angle of incidence of the transmitted beam at the first grating. For a given number of gratings, two factors can help to achieve enhanced or maximum resolving power. The first factor is to increase or maximize the angle of incidence θ, which may be determined by, for example, the prescribed beam size (e.g., chosen to match the detector array) and the available grating width. The second factor is to increase or maximize the angle of diffraction, which can be achieved by, for example, increasing or maximizing the ratio of m/d. Given geometric constraints on the angle of incidence, the angle of diffraction that yields the maximum resolving power corresponds to the case in which the diffracted beam travels back in the direction of the incident beam (the "Littrow geometry"). Possible Littrow angles for a given diffraction grating can be determined from Eq. 6 by making the substitution φ→−θ, which after simplification yields sin θ=−(mλ)/(2d).

Implementation of the Littrow geometry is difficult, if not impossible, in a planar Sagnac interferometer. The example Sagnac spectrometers shown in FIGS. 1-7, for example, are illustrated with their optical components (e.g., beamsplitters, gratings, mirrors) laid out in a common optical plane. Moreover, in the Sagnac spectrometers illustrated in FIGS. 1-7, the incident and diffracted beams at each grating both lie in a plane that is normal to the lines of the grating in question (i.e., the longitudinal axes of the lines intersect the plane at a 90° angle). As discussed herein, as the angular separation between the incident and diffracted beam at each grating decreases, the resolving power of the spectrometer can increase.

It would be desirable to implement the Littrow configuration in order to increase the resolving power of the Sagnac interferometers described herein. However, implementation of the Littrow configuration in the case of the planar Sagnac interferometers illustrated thus far would entail the following complication: as the angular separation between the incident and diffracted beams at a particular grating is reduced, the common optical path through the interferometer tends to fold upon itself, thereby reducing the amount of physical space available to position, for example, the various gratings and mirrors that define the shared optical path of the Sagnac interferometer.

With reference to FIG. 7, if the shared optical path of the Sagnac interferometer 700 were modified to try to reach the Littrow configuration for the first diffraction grating G1 (721) by reducing the angle ρ1 towards 0°, the second diffraction grating G2 (722) and the mirror M (730) would be forced closer and closer together until reaching a point where the optical path from the mirror 730 to the first diffraction grating 721 to the second diffraction grating 722 were no longer physically realizable (e.g., the mirror 730 and the second diffraction grating 722 might physically or optically interfere with one another). Similarly, if the shared optical path of the Sagnac interferometer 700 were modified to try to reach the Littrow configuration for the second diffraction grating 722, by reducing the angle ρ2 toward 0°, the first diffraction grating 721 and the third diffraction grating G3 (723) would be forced closer and closer together until reaching a point where they physically or optically interfered with one another.

In order to leave clearance for the circulating beams to pass around the various optical elements (e.g., beamsplitter, mirrors, other gratings, etc.), it would appear that the Littrow geometry may not be achievable for the planar Sagnac interferometer. However, it is in fact possible to design the Sagnac interferometer using, for example, out-of-plane optical elements, such as mirrors, gratings, and/or beamsplitters so that the beams effectively obey the Littrow geometry at one or more or all of the gratings. In addition to increasing or maximizing the resolving power, the effective Littrow geometry can also provide intrinsic beam size matching for either an even or odd number of gratings.

FIGS. 10A-12B illustrate examples of Sagnac interferometers that show how an arbitrary number of gratings can effectively be configured in the Littrow geometry using, for example, out-of-plane mirrors and/or gratings. The reinforcement principle and crossing principle are both fully satisfied in each case illustrated, though this is not necessarily required. Note that the diffracted beam at each grating does not rigorously travel back in the direction of the incident beam along the same physical optical path. However, this is not required to effectively achieve the Littrow geometry, as shown in the illustrated embodiments.

Instead, the Littrow geometry can be achieved by arranging the optical elements (e.g., gratings and mirrors) of a Sagnac interferometer such that the diffracted beam and the incident beam for one or more of the gratings lie in a "Littrow plane," which can be defined as follows:

1) Establish the rigorous Littrow geometry for a selected diffraction grating in which the diffracted beam travels back in the direction of the incident beam along the same physical optical path.

2) Identify the plane of incidence containing the grating normal and the incident beam.

3) Identify an axis of rotation lying in the plane of incidence and perpendicular to the incident beam. In general, this axis of rotation may have a component in the direction of the grating normal. The axis of rotation may also have a component that is perpendicular to the grating normal in the plane of incidence. Accordingly, it is possible to decompose rotation about said axis of rotation into, for example, two sub-rotations: a first sub-rotation about the component of said axis of rotation that is perpendicular to the grating normal in the plane of incidence; and a second sub-rotation about the component of said axis of rotation in the direction of the grating normal. Assume, for example, that a rotation about said axis of rotation through a certain angle C is to be used (e.g., to provide clearance for optical components). This single rotation is equivalent to the following two sub-rotations, which can be performed in place of the above single rotation (the angle L below is the usual Littrow angle obtained from the grating equation): i) Tilt the grating by angle A about an axis lying in the surface of the grating and perpendicular to the lines of the grating, where tan A =(cos L)(tan C); and ii) Rotate the grating by angle B about its surface normal axis, where tan B=(sin A)(tan L).

4) Rotate the grating about said axis of rotation.

5) This rotation will introduce an angle between the incident and diffracted beams, which together now establish and define the "Littrow plane."

By the above construction, the "Littrow plane" may also be defined as the plane which contains the incident beam and which lies parallel to the lines of the grating. The rotation angle in 4) above, and the angle subtended by the incident and diffracted beams in the "Littrow plane," can be chosen to clear any optical elements in the Sagnac beam path.

In some embodiments, a Sagnac interferometer can be designed using a processor that is capable of implementing computer-readable instructions. For example, the processor can be configured to identify a particular diffraction grating within the Sagnac optical path. The processor could then be configured to determine the plane of incidence for the selected diffraction grating, as well as the axis of rotation described above. The processor can then determine an angular orientation of the selected diffraction grating about the axis of rotation in order to satisfy the Littrow geometry. In some embodiments, the processor is configured to identify orthogonal components of the axis of rotation, and to determine angular orientations of the diffraction grating about each of the components of the axis of rotation.

Figure 10A:
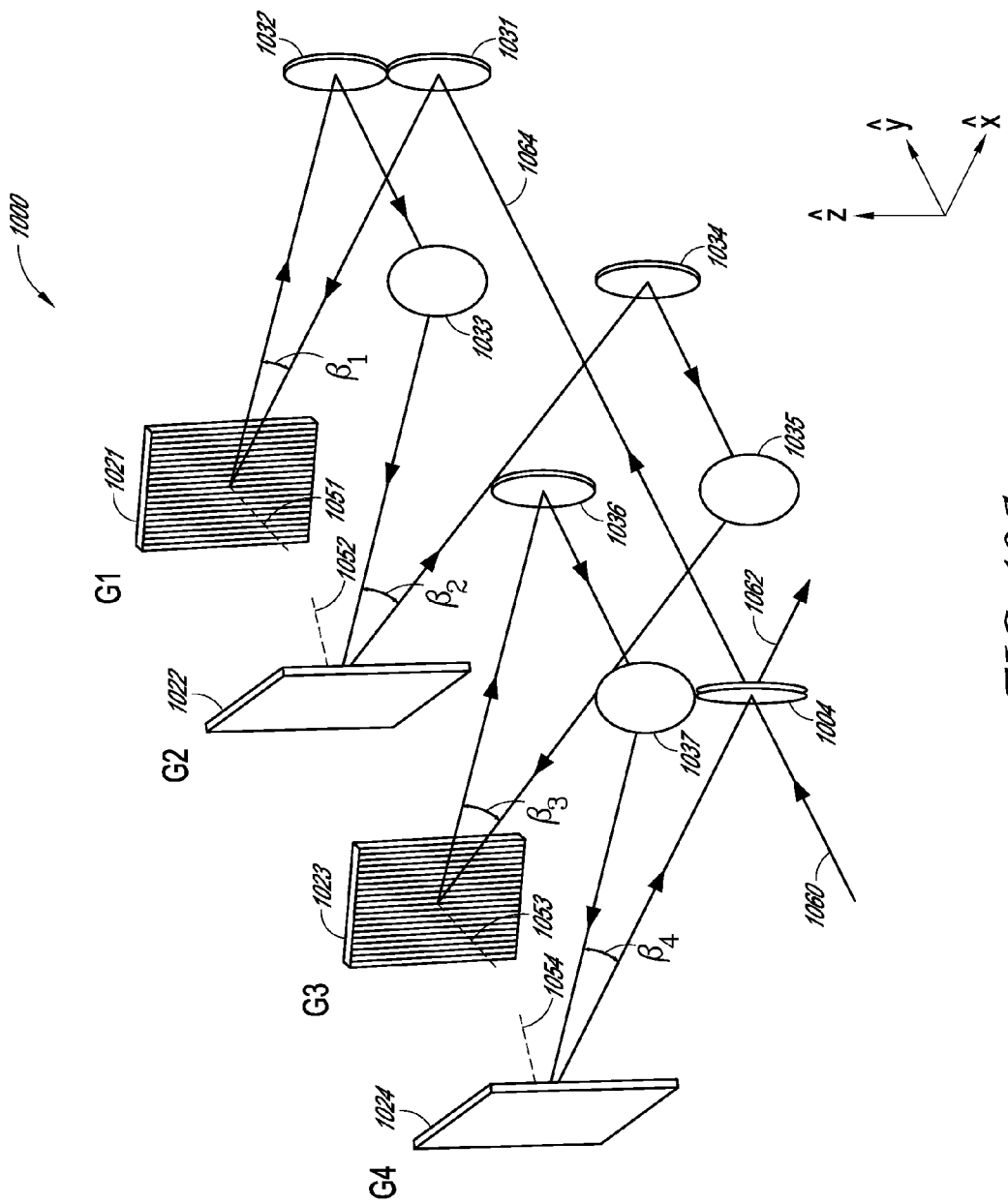
Figure 10B:
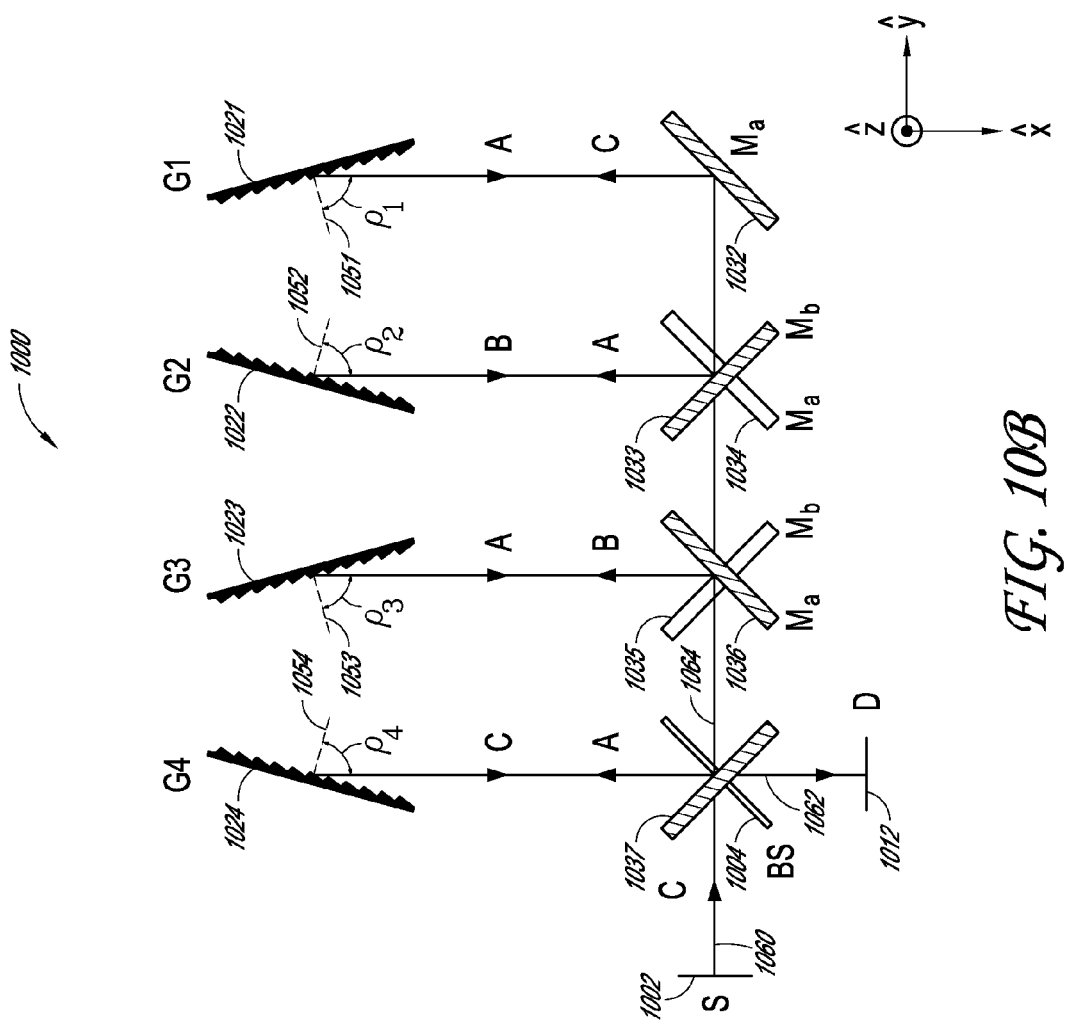

FIGS. 10A-10C are schematic diagrams of a first Sagnac interferometer 1000 formed using a beamsplitter 1004, mirrors 1031-1037, and diffraction gratings 1021-1024 arranged such that the incident and diffracted beams at each diffraction grating effectively achieve the Littrow geometry. FIG. 10A is a perspective view of the Sagnac interferometer 1000. An input beam 1060 is provided to a beamsplitter 1004 from a light source (not shown). The beamsplitter 1004 separates the input beam 1060 into a transmitted beam 1064 and a reflected beam which counter propagate along a shared optical path that is defined by the mirrors 1031-1037 and diffraction gratings 1021-1024. The path of the transmitted beam 1064 is illustrated with arrows to show the direction of the beam along the shared optical path.

In this embodiment, the beamsplitter 1004 in the input and output beams 1060, 1062 are located in a midplane defined jointly by the path of the input beam and a line normal to the optical surface of the beamsplitter. With reference to the coordinate axes illustrated in FIG. 10A, the midplane is parallel to the x-y plane. Some other optical elements in the Sagnac spectrometer 1000 are located in the midplane, above the midplane, or below the midplane.

The transmitted beam 1064 from the beamsplitter 1004 travels in the midplane until reaching the first mirror 1031. The first mirror 1031 is oriented to direct the transmitted beam 1064 toward the first grating G1 (1021) along a path that is located in the midplane. The first grating G1 is oriented such that the transmitted beam 1064 is diffracted from the first grating out of the midplane. This can be done, for example, by rotating the first grating G1 in the manner described above. In this manner, the transmitted beam 1064 can be diffracted from the first grating G1 out of the midplane. The diffracted beam from the first grating G1 proceeds along a path that subtends an angle $\beta 1$ with respect to the incident beam until reaching a second mirror 1032 which is located above the midplane.

The second mirror 1032 reflects the transmitted beam 1064 to a third mirror 1033, also located above the midplane, along an optical path that is parallel to the midplane but displaced from it in the z-direction. The third mirror 1033 is oriented so as to reflect the transmitted beam toward a second diffraction grating G2 (1022). The second diffraction grating G2 is oriented such that the beam that is incident upon it is diffracted below the midplane. The diffracted beam from the second grating G2 subtends an angle $\beta 2$ with respect to the incident beam and propagates below the midplane toward a fourth mirror 1034.

The fourth mirror 1034 reflects the transmitted beam 1064 toward a fifth mirror 1035, also located below the midplane, which is oriented to reflect the transmitted beam toward a third grating G3 (1023). The third grating G3 is oriented to diffract the beam that is incident upon it toward a sixth mirror 1036, which is located above the midplane. The diffracted beam from the third grating G3 subtends an angle $\beta 3$ with respect to the beam that is incident upon it.

The sixth mirror 1036 is oriented to reflect the transmitted beam toward a seventh mirror 1037 along a path that is parallel to the midplane but displaced from it in the z-direction. The seventh mirror 1037 directs the transmitted beam 1064 toward a fourth diffraction grating G4 (1024). The fourth grating G4 is oriented to direct the beam that it diffracts back toward the beamsplitter 1004 along a path that lies in the midplane. The diffracted beam from the fourth grating G4 subtends an angle $\beta 4$ with respect to the beam that is incident upon the fourth grating.

The beamsplitter 1004 then recombines the transmitted beam 1064 with the reflected beam (which travels substantially the same shared optical path in the opposite direction) to form an output beam 1062. The output beam 1062 may be directed to a detector (not illustrated) to create an image of an interference pattern formed within the output beam 1062.

FIG. 10B is a sectional view of the same Sagnac interferometer 1000 from a vantage point located above the midplane. The cross-section is taken parallel to the midplane. Mirrors that are located above the midplane are shaded and are labeled $M_a$, while mirrors that are located below the midplane are not shaded and are labeled $M_b$. FIG. 10B illustrates the transmitted beam using arrows to show its direction of propagation through the shared optical path of the Sagnac interferometer 1000. Sections of the shared optical path that are above the midplane are illustrated with an arrow labeled "A," sections of the shared optical path that are below the midplane are illustrated with an arrow labeled "B," and sections of the shared optical path that are located in the midplane are illustrated with an arrow labeled "C."

As illustrated in FIG. 10B, each of the diffraction gratings G1-G4 is oriented such that its respective incident and diffracted beams effectively satisfy the Littrow geometry. The respective incident and diffracted beams for each grating are located at the same angle $\rho$ with respect to the grating normal when projected onto the illustrated plane. When the incident and diffracted beams at the first grating G1 are projected onto a plane that is normal to the lines of the first grating, both projections are oriented at the angle $\rho 1$ with respect to the grating normal 1051. In this way, the first grating G1 effectively satisfies the Littrow geometry even though the incident and diffracted beams at the first grating do not propagate along the same physical optical path (e.g., the incident and diffracted beams do not physically overlap). Similarly, when the incident and diffracted beams at the second grating G2 are projected onto a plane that is normal to the lines of the second grating (not necessarily the same plane which is normal to the lines of the first grating G1), both projections are oriented at the angle $\rho 2$ with respect to the grating normal 1052. In the illustrated embodiment, the third and fourth diffraction gratings similarly satisfy the Littrow geometry.

Alternatively, in some embodiments the angle between the projections of the incident and diffracted beams for a particular grating in a plane that is normal to the lines of that grating may not be precisely 0°. Instead, the projections of the incident and diffracted beams in this plane may have some degree of angular separation, though the degree of angular separation is less than that which could be physically achieved using the same or similar optical components in a planar Sagnac interferometer arrangement. The degree of angular separation in the plane that is normal to the lines of the grating can be made less than that which could be physically achieved if the actual incident and diffracted beams were to both lie in that plane (which degree of angular separation will very depending upon the size and type of optical components used in a Sagnac interferometer design) because of the extra physical space afforded by the angular separation of the beams in the Littrow plane. In this way, benefits associated with the Littrow geometry can be obtained even when the angle between the projections of the incident and diffracted beams in a plane normal to the lines of a grating is not precisely 0° but those projections are still not substantially angularly separated.

As discussed above, in the case of each of the diffraction gratings G1-G4, the projections of the incident and diffracted beams at each grating in a plane that is normal to the lines of the grating in question overlap one another. However, as illustrated in FIG. 10C, projections of the incident and diffracted beams at each grating in a plane that is parallel with the lines of the grating in question do not overlap one another. Instead the projections of the incident and diffracted beams in these parallel planes are angularly separated. In particular, the incident and diffracted beams at each grating are angularly separated in the Littrow plane of the grating in question. FIG. 10C illustrates a sectional view of the first diffraction grating G1 (1021) of the Sagnac interferometer 1000. The sectional view is taken from the Littrow plane, which is parallel with the lines of the first diffraction grating G1 and which contains the incident and diffracted beams. With reference to the illustrated coordinate axes, the Littrow plane is parallel to the x-z plane. As illustrated in FIG. 10C, the first grating G1 can be rotated as discussed herein such that the incident beam, which lies in the midplane, and the diffracted beam are angularly separated in the Littrow plane. In this case, the incident and diffracted beams subtend an angle $\beta1$. This is in contrast to the projections of the incident and diffracted beams in a plane that is normal to the lines of the first grating G1, which, as already discussed, are not angularly separated.

FIG. 10C also illustrates the second diffraction grating G2 (1022) of the Sagnac interferometer 1000, which is shown projected in the Littrow plane of the second grating. As illustrated, the second grating G2 is oriented such that the incident beam from above the midplane and the diffracted beam, which is directed below the midplane, subtend an angle $\beta2$ in the Littrow plane. Once again, this is in contrast to the projections of the incident and diffracted beams in a plane that is normal to the lines of the second grating G2, which are not angularly spaced apart.

It should be understood that the Sagnac spectrometer 1000 is one of many possible embodiments where the Littrow geometry is effectively satisfied. Many other layouts exist, two of which are illustrated in FIGS. 11 and 12. For example, a greater or lesser number of gratings could be used, some of which may not satisfy the Littrow geometry. The gratings can be transmissive or reflective. In addition, planar or curved diffraction gratings can be used. As illustrated, each of the diffraction gratings can include a plurality of parallel lines (e.g., grooves or other repeating diffractive features) for diffracting light. In some embodiments, holographic gratings can be used. While the gratings in the Sagnac spectrometer 1000 are illustrated as sharing parallel Littrow planes, this is not required. Moreover, each grating can be oriented such that their respective lines are normal to different planes. The layout of the diffraction gratings can be symmetric or not. The angle subtended by the incident and diffracted beams for each grating in its Littrow plane can be different or the same. Similarly, the angle between the grating normal for each grating and the projections of its associated incident and diffracted beams in the plane that is normal to the lines of the grating can be the same or different for each grating. The specific locations and orientations of beamsplitters, mirrors, diffraction gratings, etc. in any given embodiment can be determined using, for example, ray tracing software. In addition, the Sagnac spectrometer 1000 can include one or more actuators to rotate, for example, the gratings and mirrors about one or more axes to alter the design wavelength of the spectrometer.

FIGS. 11A and 11B are schematic diagrams of a second Sagnac interferometer 1100 formed using a beamsplitter 1104, mirrors 1131-1135, and diffraction gratings 1121-1126 arranged such that the incident and diffracted beams at each diffraction grating effectively achieve the Littrow geometry. FIG. 11A is a sectional view of the Sagnac interferometer 1100. An input beam 1160 is provided to a beamsplitter 1104 from a light source (not shown). The beamsplitter 1104 separates the input beam 1160 into a transmitted beam and a reflected beam which counter propagate along a shared optical path that is defined by the mirrors 1131-1135 and the diffraction gratings 1121-1126. The path of the transmitted beam is illustrated with arrows to show the direction of the beam along the shared optical path.

The beamsplitter 1104 is located in a midplane. Other optical elements of the Sagnac interferometer 1100 are located above or below the midplane. For example, mirrors 1131, 1133, and 1135 are located above the midplane and are shaded and labeled $M_a$, while mirrors 1132 and 1134 are located below the midplane, are not shaded, and are labeled $M_b$. Sections of the shared optical path through the Sagnac interferometer 1100 that are above the midplane are illustrated with an arrow labeled "A," sections of the shared optical path that are below the midplane are illustrated with an arrow labeled "B," and sections of the shared optical path that are located in the midplane are illustrated with an arrow labeled "C."

The transmitted beam 1164 from the beamsplitter 1104 travels in the midplane until reaching the first diffraction grating G1 (1121). At the first diffraction grating G1, the transmitted beam is diffracted back in the same direction from which it is incident upon the first grating G1, when the incident and diffracted beams are projected onto the plane that is perpendicular to the lines of the first grating G1. Specifically, the incident beam and the diffracted beam are both oriented at an angle $\rho1$ when projected in this plane. In reality, however, the incident and diffracted beams at the first grating G1 are angularly separated in the Littrow plane in a manner similar to that which is illustrated in FIGS. 10A and 10C. The transmitted beam from the beamsplitter 1104 is diffracted at the first grating G1 at an angle with respect to the midplane such that it propagates toward the first mirror 1131, which is located above the midplane.

The transmitted beam reflects from the first mirror 1131 toward the second grating G2 (1122). As illustrated, the incident and diffracted beams at the second grating G2 likewise satisfy overlap when projected into a plane that is normal to the lines of the second grating G2. The second grating G2 is arranged using the techniques described herein such that the beam that is incident upon it is diffracted toward the second mirror 1132, which is located below the midplane. Thus, after diffracting from the second grating G2, the transmitted beam propagates below the first mirror 1131 to the second mirror 1132 where it is reflected toward the third grating G3 (1123).

The third grating G3 is oriented such that the transmitted beam is directed toward the third mirror 1133, which is located above the midplane. In similar fashion, the transmitted beam is reflected by the third mirror 1133 toward the fourth grating G4 (1124), which is oriented so as to diffract the beam toward the fourth mirror 1134, which is located below the midplane. The fourth mirror 1134 than reflects the transmitted beam toward the fifth grating G5 (1125), which is arranged so as to diffract the beam toward the fifth mirror 1135, located above the midplane. The fifth mirror 1135 than reflects the transmitted beam toward the sixth grating G6 (1126). The sixth grating G6 then diffracts the transmitted beam back toward the beamsplitter 1104, located in the midplane, which recombines the transmitted and reflected beams into the output beam 1162. The output beam 1162 is directed toward the detector 1112, which provides an image of the interferogram created by the Sagnac interferometer 1100.

In FIG. 11A, each of the gratings G1-G6 satisfies the Littrow geometry. Nevertheless, using the techniques described herein, the gratings G1-G6 and mirrors 1131-1135 are variously positioned in the midplane, above the midplane, and below the midplane so as to create space for each optical element to be positioned without physically or optically interfering with one another in spite of the Littrow geometry being satisfied.

FIG. 11B is a schematic diagram showing the positions of the mirrors 1131-1135 from the Sagnac interferometer 1100. The position of each of the mirrors 1131-1135 is marked by a correspondingly labeled circle. Mirrors 1131, 1133, and 1135, which are located above the midplane, are shown with shaded circles, while mirrors 1132 and 1134, which are located below the midplane, are shown with unshaded circles. As illustrated in FIG. 11B, in some embodiments, each of the mirrors 1131-1135 lies tangent to a circle 1190 at different angular locations about the circle.

In FIG. 11A, the optical path of the Sagnac interferometer 1100 includes diffraction gratings G1-G6 that are spaced along an arc of almost 180°. As an optical beam propagates through the shared optical path of the Sagnac interferometer 1100, it reflects from a mirror (i.e., 1131-1135) at each section of this arc. Each of these reflections can introduce an image rotation effect, which can have a relatively mirror negative impact on the resolving power of the instrument. The image rotation effect can be reduced by compactly arranging the gratings G1-G6 along a shorter angular arc.

FIGS. 12A and 12B are schematic diagrams of a third Sagnac interferometer 1200 formed using a beamsplitter 1204, a mirror 1231, and diffraction gratings 1221, 1222 arranged such that the incident and diffracted beams at each diffraction grating effectively achieve the Littrow geometry. FIG. 12A is a sectional view of the Sagnac interferometer 1200. An input beam 1260 is provided to a beamsplitter 1204 from a light source (not shown). The beamsplitter 1204 separates the input beam 1260 into a transmitted beam and a reflected beam which counter propagate along a shared optical path that is defined by the mirror 1231 and the diffraction gratings 1221, 1222. The path of the transmitted beam is illustrated with arrows to show the direction of the beam along the shared optical path.

The beamsplitter 1204 is located in a midplane, while the mirror 1231 is located above the midplane. Sections of the shared optical path through the Sagnac interferometer 1200 that are above the midplane are illustrated with an arrow labeled "a," while sections of the shared optical path that are located in the midplane are illustrated with an arrow labeled "c."

The transmitted beam 1264 from the beamsplitter 1204 travels in the midplane until reaching the first diffraction grating G1 (1221). At the first diffraction grating G1, the transmitted beam is diffracted back in the same direction from which it is incident upon the first grating G1, as projected onto a plane that is perpendicular to the lines of the first grating G1. Specifically, the incident beam and the diffracted beam are both oriented at an angle ρ1 with respect to the grating normal 1251 when projected in this plane. As previously discussed, in reality the incident and diffracted beams do not actually travel the same physical optical path but are angularly separated in the Littrow plane in a manner similar to that which is illustrated in FIG. 10A. The first grating G1 is oriented using the techniques discussed herein such that the transmitted beam from the beamsplitter 1204 is diffracted at an angle with respect to the midplane. The diffracted beam from the first grating G1 then propagates toward the mirror 1231 that is located above the midplane.

The mirror 1231 is oriented so as to reflect the transmitted beam toward the second grating G2 (1222). The Littrow geometry is likewise satisfied at the second grating G2, as both of the incident and diffracted beams are oriented at an angle ρ2 with respect to the grating normal 1252 when projected onto a plane that is normal to the lines of the second grating G2. The second grating G2 is oriented such that the diffracted beam from the second grating is directed in the midplane back toward the beamsplitter 1204 where it is recombined with the reflected beam, thus forming the output beam 1262 that propagates to the detector 1212.

FIG. 12A includes portions labeled "view A" and "view B." Views A and B are illustrated in FIG. 12B. As illustrated in FIG. 12B, either or both of the first and second gratings G1, G2 can be replaced by a number of gratings. For example, FIG. 12B shows that the second grating G2 can be replaced by six gratings 1223-1228, though other more or fewer gratings could be used. FIG. 12B is a sectional view that shows the projections of the incident and diffracted beams at each of the gratings 1223-1228 and a plane that is parallel with the optical surfaces of the gratings. As is evident, the projections in this plane of the incident and diffracted beams for each of the gratings are angularly separated by an angle β. Each of the gratings 1223-1228 can be oriented using the techniques described herein to satisfy the Littrow geometry.

As discussed herein, embodiments of a Sagnac interferometer FTSs that implement the Littrow geometry can have improved resolving power. For example, if the Sagnac spectrometer 700 of FIG. 7 were re-designed to implement the Littrow geometry using the techniques described herein, the resolving power of the instrument could be increased. As an example, assuming 20° between the incident and diffracted beams and a practical angle of incidence of θ=75, the line density that yields the Littrow geometry would increase the resolving power in Eq. (16) by about 8%. Depending upon the application, this increase in resolving power could be significant. For other Sagnac interferometer designs, the implementation of the Littrow geometry using the techniques described herein could result in greater or lesser improvements in resolving power.

Figure 13:
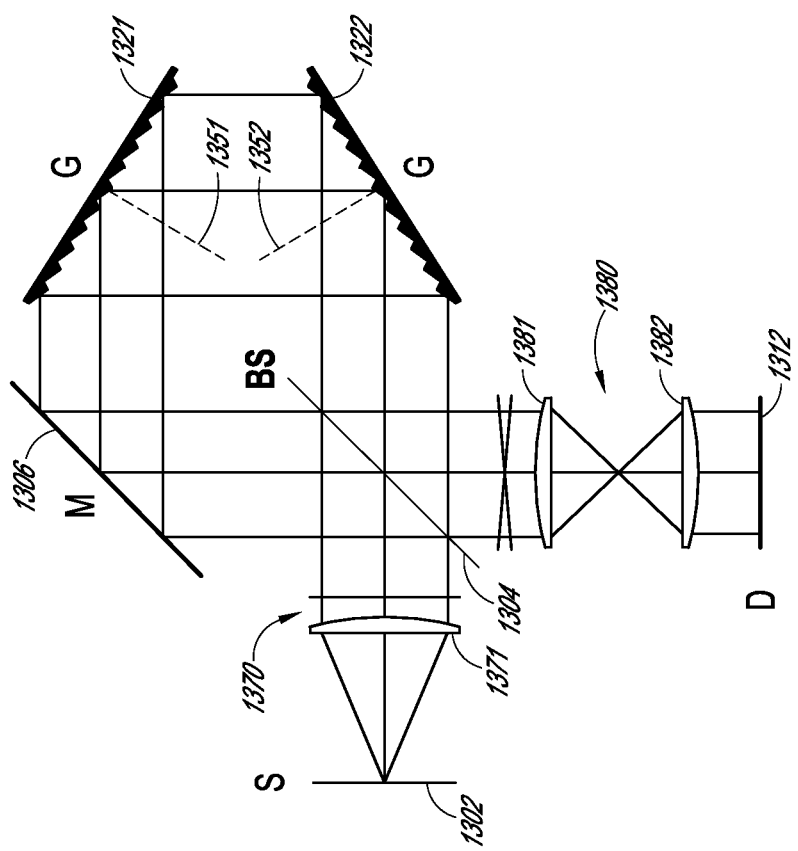
FIG. 13 is a schematic diagram of a Sagnac interferometer similar to that of FIG. 2, which additionally includes imaging optics.

FIG. 13 is a schematic diagram of a Sagnac interferometer similar to that of FIG. 2, which additionally includes imaging optics. The Sagnac interferometer in FIG. 13 includes a light source 1302, a beamsplitter 1304, a mirror 1306, diffraction gratings 1321, 1322, and a detector 1312. The operation of these components is similar to the operation of the corresponding components that was described with respect to FIG. 2. However, the Sagnac interferometer of FIG. 13 additionally includes an input optical system 1370 and imaging optics 1380. In some embodiments, the input optical system 1370 includes a lens 1371 for collimating light from the light source 1302. However the input optical system could include any optical element, or combination of optical elements, for conditioning the input light. In some embodiments, the imaging optics 1380 include a telescope with relay lenses 1381, 1382 for transferring the interferogram to the detector 1312. In some embodiments, the imaging optics can be used to image the "fringe formation plane" (FFP) of the interferometer onto the detector, provide magnification of the interferogram to match the size of the detector 1312, or otherwise condition the output light as needed in a given application.

Figure 14:
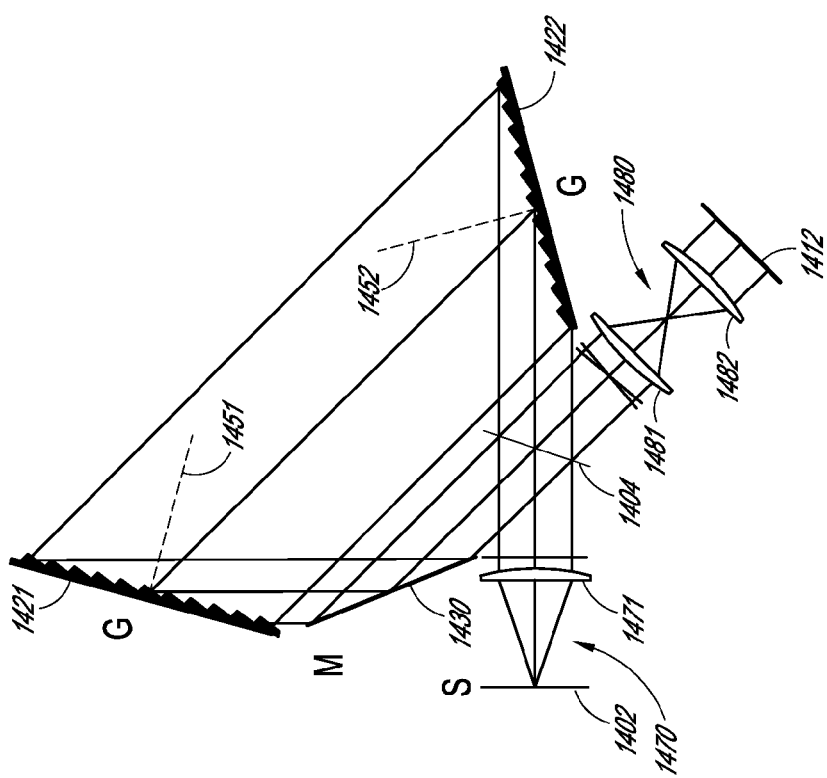
FIG. 14 is a schematic diagram of a Sagnac interferometer similar to that of FIG. 4, which additionally includes imaging optics.
Figure 15:
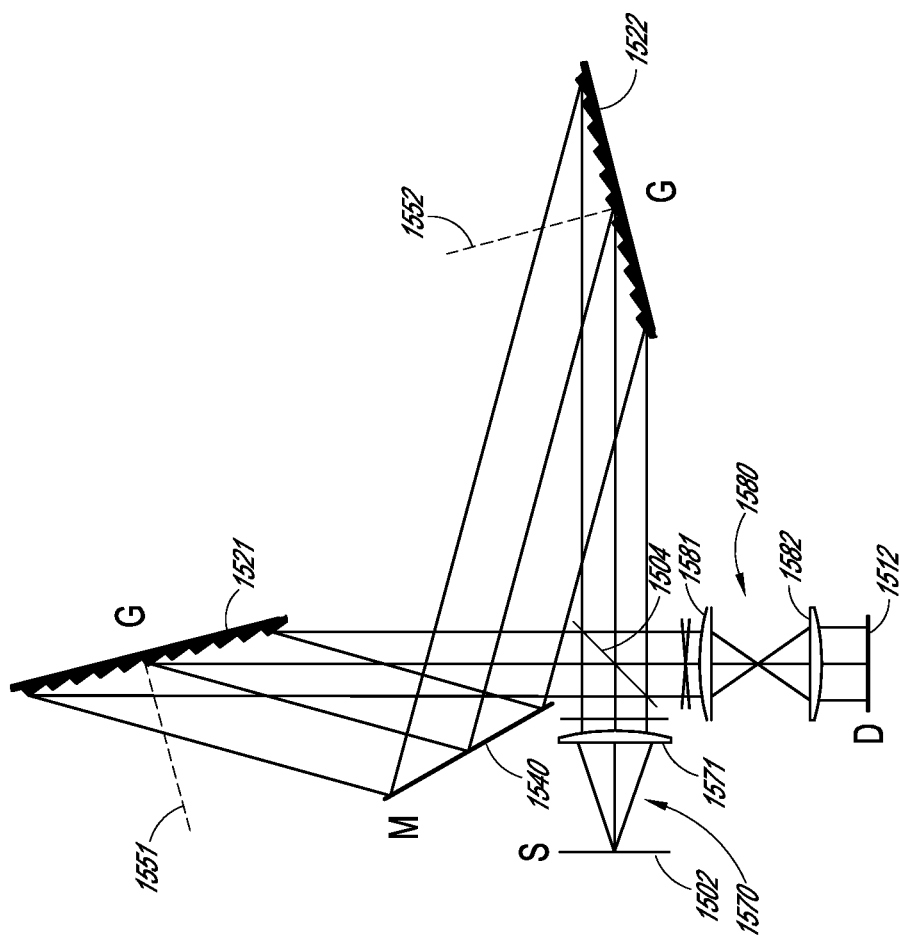
FIG. 15 is a schematic diagram of a Sagnac interferometer similar to that of FIG. 5, which additionally includes imaging optics.

FIG. 14 is a schematic diagram of a Sagnac interferometer similar to that of FIG. 4, which additionally includes imaging optics, while FIG. 15 is a schematic diagram of a Sagnac interferometer similar to that of FIG. 5, which additionally includes imaging optics. The Sagnac interferometers of FIGS. 14 and 15 include light sources 1402, 1502, beamsplitters 1404, 1504, diffraction gratings 1421, 1422, 1521, 1522, and detectors 1412, 1512. The operation of these components is similar to the operation of the corresponding components that was described with respect to FIGS. 4 and 5, respectively. In addition, the Sagnac interferometers of FIGS. 14 and 15 include input optical systems 1470, 1570 and imaging optics 1480, 1580. The operation of these components can be similar to what was described with respect to the input optical system 1370 and the imaging optics 1380 in FIG. 13. In addition, it should be understood that any of the other Sagnac interferometers discussed herein, including the Littrow embodiments, can also include such input optical systems and imaging optics.

Embodiments have been described in connection with the accompanying drawings. However, it should be understood that the figures are not necessarily drawn to scale. Distances, angles, etc. are merely illustrative and do not necessarily bear an exact relationship to actual dimensions and layout of the devices illustrated. In addition, the foregoing embodiments have been described at a level of detail to allow one of ordinary skill in the art to make and use the devices, systems, etc. described herein. A wide variety of variation is possible. Components, elements, and/or steps can be altered, added, removed, or rearranged. While certain embodiments have been explicitly described, other embodiments will become apparent to those of ordinary skill in the art based on this disclosure.

The various illustrative algorithm steps described in connection with the embodiments disclosed herein can be implemented as, for example, electronic hardware, computer software, or combinations of both. To clearly illustrate this interchangeability of hardware and software, various illustrative steps have been described above generally in terms of their functionality. Whether such functionality is implemented as hardware or software depends upon the particular application and design constraints imposed on the overall system. The described functionality can be implemented in varying ways for each particular application, but such implementation decisions should not be interpreted as causing a departure from the scope of the disclosure.

In addition, the various illustrative algorithm steps can be implemented or performed with any processor, including a general purpose microprocessor, a digital signal processor (DSP), an application specific integrated circuit (ASIC), a field programmable gate array (FPGA) or other programmable logic device, discrete gate or transistor logic, discrete hardware components, a controller, a microcontroller, a state machine, a desktop calculator, or any combination thereof or any other processing equipment designed to perform the functions described herein. A processor can be implemented as a combination of computing devices, e.g., a combination of a DSP and a microprocessor, a plurality of microprocessors, one or more microprocessors in conjunction with a DSP core, or any other such configuration. A processor can also be implemented by one or more devices that are communicatively coupled (e.g., in a network) via a communication link (e.g., wired or wireless communication).

A software module or other machine-readable instructions can reside in non-transitory machine-readable media. For example, computer-readable instructions can reside in RAM memory, flash memory, ROM memory, EPROM memory, EEPROM memory, registers, a hard disk, a removable disk, a CD-ROM, DVD, or any other form of computer-readable storage medium known in the art. An exemplary storage medium is coupled to a processor such that the processor can read information from, and write information to, the storage medium. In the alternative, the storage medium can be integral to the processor. The processor and the storage medium can reside in an ASIC. The ASIC can reside in a user terminal. In the alternative, the processor and the storage medium can reside as discrete components in a user terminal.

While the above detailed description has shown, described, and pointed out novel features as applied to various embodiments, it will be understood that various omissions, substitutions, and changes in the form and details of the devices or algorithms illustrated can be made without departing from the spirit of the disclosure. As will be recognized, certain embodiments of the inventions described herein can be embodied within a form that does not provide all of the features and benefits set forth herein, as some features can be used or practiced separately from others. The scope of certain inventions disclosed herein is indicated by the appended claims rather than by the foregoing description. All changes which come within the meaning and range of equivalency of the claims are to be embraced within their scope.

What is claimed is:

1. A Sagnac interferometer comprising:
a beamsplitter arranged to receive an input beam of light of a design wavelength, to split the input beam of light into first and second beams that counter propagate around an optical path, and to recombine the first and second beams into an output beam of light,
wherein the optical path comprises at least a first diffraction grating that comprises a plurality of parallel lines, the first diffraction grating being arranged to receive the first beam incident thereon as a first incident beam along a first incident path at a first incident angle and to diffract the first incident beam along a first diffraction path at a first diffraction angle, and
wherein the first diffraction grating is oriented such that the first incident path and the first diffraction path are not located in a plane that is normal to the plurality of parallel lines of the first diffraction grating.

2. The Sagnac interferometer of claim 1, wherein projections of the first incident path and the first diffraction path onto the plane that is normal to the plurality of lines of the first diffraction grating are not substantially angularly separated.

3. The Sagnac interferometer of claim 2, wherein the first incident path does not comprise the same portion of the optical path as the first diffraction path.

4. The Sagnac interferometer of claim 1, wherein the first incident path and the first diffraction path are angularly separated in a plane that is parallel with the plurality of lines of the first diffraction grating, and which includes the first incident path and the first diffracted path.

5. The Sagnac interferometer of claim 1, wherein the optical path further comprises a second diffraction grating that comprises a plurality of parallel lines, the second diffraction grating being arranged to receive the first beam incident thereon as a second incident beam along a second incident path at a second incident angle and to diffract the second incident beam along a second diffraction path at a second diffraction angle, and wherein projections of the second incident path and the second diffraction path onto a plane that is perpendicular to the plurality of lines of the second diffraction grating are not substantially angularly separated.

6. The Sagnac interferometer of claim 1, wherein the optical path further comprises a second diffraction grating that comprises a plurality of parallel lines, the second diffraction grating being arranged to receive the first beam incident thereon as a second incident beam along a second incident path at a second incident angle and to diffract the second incident beam along a second diffraction path at a second diffraction angle, and wherein the second incident path and the second diffraction path are angularly separated in a plane that is parallel with the plurality of lines of the second diffraction grating, and which includes the second incident path and the second diffracted path.

7. The Sagnac interferometer of claim 6, wherein, when the input beam comprises wavelengths $\lambda 1$ and $\lambda 2$, the first diffraction angle, the second incident angle, and the second diffraction angle for the wavelength $\lambda 1$ are different from the first diffraction angle, the second incident angle, and the second diffraction angle for the wavelength $\lambda 2$, respectively, the difference between the second diffraction angle for the wavelength $\lambda 1$ and the second diffraction angle for the wavelength $\lambda 2$ including a first contribution caused by the difference in the respective wavelengths on the diffraction of the second incident beam by the second diffraction grating, and a second contribution caused by a difference in the respective second incident angles resulting from the difference in the respective first diffraction angles, the first contribution reinforcing the second contribution.

8. The Sagnac interferometer of claim 7, wherein the optical path further comprises an odd number of mirrors between the first and second diffraction gratings.

9. The Sagnac interferometer of claim 6, wherein the optical path further comprises third and fourth diffraction gratings arranged to satisfy the effective Littrow geometry.

10. The Sagnac interferometer of claim 1, wherein the optical path comprises a diffractive order of the first diffraction grating that is greater in magnitude than the ±1 diffractive order.

11. The Sagnac interferometer of claim 1, wherein interferometer is symmetrical.

12. The Sagnac interferometer of claim 1, further comprising a detector arranged to receive the output beam.

13. The Sagnac interferometer of claim 12, further comprising an imaging optical system to image an interference pattern formed in the output beam upon the detector.

14. The Sagnac interferometer of claim 1, wherein the optical path further comprises a plurality of mirrors, wherein not all of the plurality of mirrors are located in a common optical plane.

15. A Sagnac interferometer comprising:
a beamsplitter arranged to receive an input beam of light of a design wavelength, to split the input beam of light into first and second beams that counter propagate around an optical path, and to recombine the first and second beams into an output beam of light,
wherein the optical path comprises at least a first diffraction grating that comprises a plurality of parallel lines, the first diffraction grating being arranged to receive the first beam incident thereon along a first incident path and to diffract the first beam along a first diffraction path, and
wherein the first diffraction path is directed in substantially the same direction as the first incident path when viewed in a plane that is normal to the parallel lines of the first diffraction grating.

16. The Sagnac interferometer of claim 15, wherein the first incident path and the first diffraction path subtend a non-zero angle when projected in a plane that is parallel with the plurality of parallel lines of the first diffraction grating.

17. A Sagnac interferometer comprising:
a beamsplitter arranged to receive an input beam of light of a design wavelength, to split the input beam of light into first and second beams that counter propagate around an optical path, and to recombine the first and second beams into an output beam of light,
wherein the optical path comprises at least a first diffraction grating, the first diffraction grating being arranged to receive the first beam incident thereon along a first incident path and to diffract the first beam along a first diffraction path, and
wherein the first incident path and the first diffraction path are angularly separated when projected in a plane that is parallel with the plurality of parallel lines of the first diffraction grating.

18. The Sagnac interferometer of claim 17, wherein the first incident path and the first diffraction path are angularly separated in a plane that is parallel with the plurality of parallel lines of the first diffraction grating and which contains the first incident path and the first diffraction path.

19. A Sagnac interferometer comprising:
a beamsplitter arranged to receive an input beam of light of a design wavelength, to split the input beam of light into first and second beams that counter propagate around an optical path, and to recombine the first and second beams into an output beam of light,
wherein the optical path comprises at least a first diffraction grating, the first diffraction grating being oriented in the optical path at an angle to receive the first beam incident thereon along a first incident path and to diffract the first beam along a first diffraction path in a manner that satisfies the effective Littrow geometry.

20. The Sagnac interferometer of claim 19, wherein the first incident path and the first diffraction path comprise different portions of the optical path.

21. The Sagnac interferometer of claim 19, wherein the first diffraction grating comprises a plurality of parallel lines, and wherein the first incident path and the first diffraction path are angularly separated in a plane that is parallel with the plurality of parallel lines of the first diffraction grating and which contains the first incident path and the first diffraction path.

22. The Sagnac interferometer of claim 19, wherein the first diffraction grating comprises a plurality of parallel lines, and wherein projections of the first incident path and the first diffraction path onto the plane that is normal to the plurality of lines of the first diffraction grating overlap one another.

23. A Sagnac interferometer comprising:
a beamsplitter arranged to receive an input beam of light of a design wavelength, to split the input beam of light into first and second beams that counter propagate around an optical path, and to recombine the first and second beams into an output beam of light,
wherein the optical path comprises at least a first diffraction grating, the first diffraction grating being oriented in the optical path at an angle to receive the first beam incident thereon along a first incident path and to diffract the first beam along a first diffraction path, and
wherein both the first incident path and the first diffraction path lie in the Littrow plane of the first diffraction grating.

24. The Sagnac interferometer of claim 23, wherein the first diffraction grating comprises a plurality of parallel lines, and wherein projections of the first incident path and the first diffraction path onto the plane that is normal to the plurality of lines of the first diffraction grating overlap one another.

25. A method of designing a Sagnac interferometer, the method comprising:
identifying a diffraction grating located in a shared optical path of counter propagating beams of light, the shared optical path comprising an incident beam path and a diffracted beam path for the diffraction grating, and the diffraction grating comprising a plurality of parallel lines;

determining a plane of incidence for the selected diffraction grating, the plane of incidence containing the diffraction grating normal and the incident beam path;

determining an axis of rotation which lies in the plane of incidence and is perpendicular to the incident beam path; and determining an angular orientation of the selected diffraction grating about the axis of rotation, wherein the angular orientation about the axis of rotation is selected such that the first incident path and the first diffraction path are not located in a plane that is normal to the plurality of parallel lines of the first diffraction grating, and wherein the method is at least partially performed using a processor.

26. The method of claim 25, wherein the angular orientation about the axis of rotation is selected such that projections of the first incident path and the first diffraction path onto the plane that is normal to the plurality of lines of the first diffraction grating are not substantially angularly separated.

27. The method of claim 25, wherein the angular orientation about the axis of rotation is selected such that the first incident path and the first diffraction path are angularly separated in a plane that is parallel with the plurality of lines of the first diffraction grating, and which includes the first incident path and the first diffracted path.

28. A Sagnac interferometer comprising:

a beamsplitter arranged to receive an input beam of light of a design wavelength, to split the input beam of light into first and second beams that counter propagate around an optical path, and to recombine the first and second beams into an output beam of light, the path of the input beam of light and the beamsplitter normal jointly defining a reference plane;

wherein the optical path comprises at least one mirror or diffraction grating that is out of the reference plane.

29. The Sagnac interferometer of claim 28, wherein said mirror or diffraction grating is arranged such that the midpoint of the intersection of said first beam with the mirror or diffraction grating is not located in the reference plane.

* * * * *